US009609108B2

(12) United States Patent
Miura

(10) Patent No.: US 9,609,108 B2
(45) Date of Patent: Mar. 28, 2017

(54) ELECTRONIC DEVICE, CONTROL METHOD, AND CONTROL PROGRAM

(71) Applicant: KYOCERA Corporation, Kyoto-shi, Kyoto (JP)

(72) Inventor: Saya Miura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,276

(22) PCT Filed: Sep. 25, 2013

(86) PCT No.: PCT/JP2013/075897
§ 371 (c)(1),
(2) Date: Mar. 25, 2015

(87) PCT Pub. No.: WO2014/050881
PCT Pub. Date: Apr. 3, 2014

(65) Prior Publication Data
US 2015/0249733 A1 Sep. 3, 2015

(30) Foreign Application Priority Data

Sep. 26, 2012 (JP) .................. 2012-212627
Sep. 26, 2012 (JP) .................. 2012-212831

(51) Int. Cl.
H04M 1/00 (2006.01)
H04M 1/725 (2006.01)
(Continued)

(52) U.S. Cl.
CPC ...... *H04M 1/72522* (2013.01); *G06F 3/0481* (2013.01); *G06F 3/0482* (2013.01);
(Continued)

(58) Field of Classification Search
CPC ..................... H04M 1/72502; H04M 1/72563
USPC ........................................... 455/566
See application file for complete search history.

(56) References Cited

U.S. PATENT DOCUMENTS

2009/0249247 A1* 10/2009 Tseng ................ H04M 1/72552
715/808
2011/0185396 A1 7/2011 Ohta et al.
(Continued)

FOREIGN PATENT DOCUMENTS

JP 2006-3486 A 1/2006
JP 2008-33763 A 2/2008
(Continued)

OTHER PUBLICATIONS

Office Action in JP Application No. 2012-212831, mailed Aug. 2, 2016, for which an explanation of relevance is attached.
(Continued)

Primary Examiner — Wesley Kim
Assistant Examiner — Raj Chakraborty
(74) Attorney, Agent, or Firm — Hauptman Ham, LLP

(57) ABSTRACT

An electronic device according to one of aspects includes: a display for displaying a notification screen that includes a notification area for notifying information; and a controller for shifting, when detecting an operation, the notification screen displayed on the display to an editing screen for editing the notification screen.

18 Claims, 30 Drawing Sheets

(51) Int. Cl.
*G06F 3/0481* (2013.01)
*G06F 3/0488* (2013.01)
*G06F 3/0482* (2013.01)

(52) U.S. Cl.
CPC ........ *G06F 3/0488* (2013.01); *G06F 3/04817* (2013.01); *H04M 1/72563* (2013.01); *G06F 2203/04106* (2013.01); *G06F 2203/04108* (2013.01)

(56) References Cited

U.S. PATENT DOCUMENTS

| | | | |
|---|---|---|---|
| 2011/0269506 A1* | 11/2011 | Choi | H04M 1/7253 455/566 |
| 2011/0319139 A1 | 12/2011 | Kondo | |
| 2013/0290442 A1* | 10/2013 | Dgani | G06Q 10/107 709/206 |

FOREIGN PATENT DOCUMENTS

| JP | 2009-60610 A | 3/2009 |
|---|---|---|
| JP | 2009-135728 A | 6/2009 |
| JP | 2011-147019 A | 7/2011 |
| JP | 2011-175633 A | 9/2011 |
| JP | 2012-8866 A | 1/2012 |
| JP | 2012-156793 A | 8/2012 |

OTHER PUBLICATIONS

International Search Report and Written Opinion mailed Dec. 17, 2013 in corresponding International Application No. PCT/JP2013/075897.

Hajime Kawamura, "Latest Windows 98/95 Revisited: Understand Windows to understand its operation and troubleshooting" Monthly ASCII, PC, vol. 2, No. 11, Nov. 1, 1999, pp. 32 to 34.

Naohisa Iwamoto, "Solve Usability Problem of Smartphone! Comfortable settings of Android smartphone" Nikkei Personal Computing, Jul. 9, 2012, No. 653, pp. 70 to 73.

Office Action in JP Application No. 2012-212627, mailed Mar. 1, 2016, for which an explanation of relevance is attached.

Office Action mailed Nov. 17, 2015, corresponding to Japanese Patent Application No. 2012-212627, for which an explanation of relevance is attached.

* cited by examiner

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2013/075897 filed on Sep. 25, 2013 which designates the United States, incorporated herein by reference, and which is based upon and claims the benefit of priority from Japanese Patent Applications No. 2012-212627 and No. 2012-212831 filed on Sep. 26, 2012, the entire contents of which are incorporated herein by reference.

FIELD

The present application relates to an electronic device, a control method, and a control program.

BACKGROUND

Some of electronic devices such as mobile phones or smartphones have a notification area for notifying a user of information. The notification area is provided above a screen displayed on a display (see Patent Literatures 1 and 2). Displayed in the notification area is, for example, information related to a service provided by an application operating in a background using an icon or the like. The notification area may be called a status bar or so. Some of electronic devices such as mobile phones or smartphones also include those capable of displaying a notification screen for displaying detailed information for the information displayed in the status bar.

CITATION LIST

Patent Literature

Patent Literature 1: JP-A-2012-156793
Patent Literature 2: JP-A-2011-175633

Technical Problem

There is a need for effectively using the notification screen in the electronic device such as a mobile phone or a smartphone.

SUMMARY

An electronic device according to one of aspects includes: a display for displaying a notification screen that includes a notification area for notifying information; and a controller for shifting, when detecting an operation, the notification screen displayed on the display to an editing screen for editing the notification screen.

A control method according to one of aspects is a control method for controlling an electronic device that includes a display. The control method includes: displaying a notification screen that includes a notification area for notifying information on the display; and shifting, when detecting an operation, the notification screen displayed on the display to an editing screen for editing the notification screen.

A control program according to one of aspects causes an electronic device that includes a display to execute: displaying a notification screen that includes a notification area for notifying information on the display; and shifting, when detecting an operation, the notification screen displayed on the display to an editing screen for editing the notification screen.

DESCRIPTION OF EMBODIMENTS

Exemplary embodiments for implementing the electronic device, the control method, and the control program according to the present application will be explained in detail with reference to the accompanying drawings. A smartphone will be explained below as one of examples of the electronic device.

Embodiment 1

Figure 1:
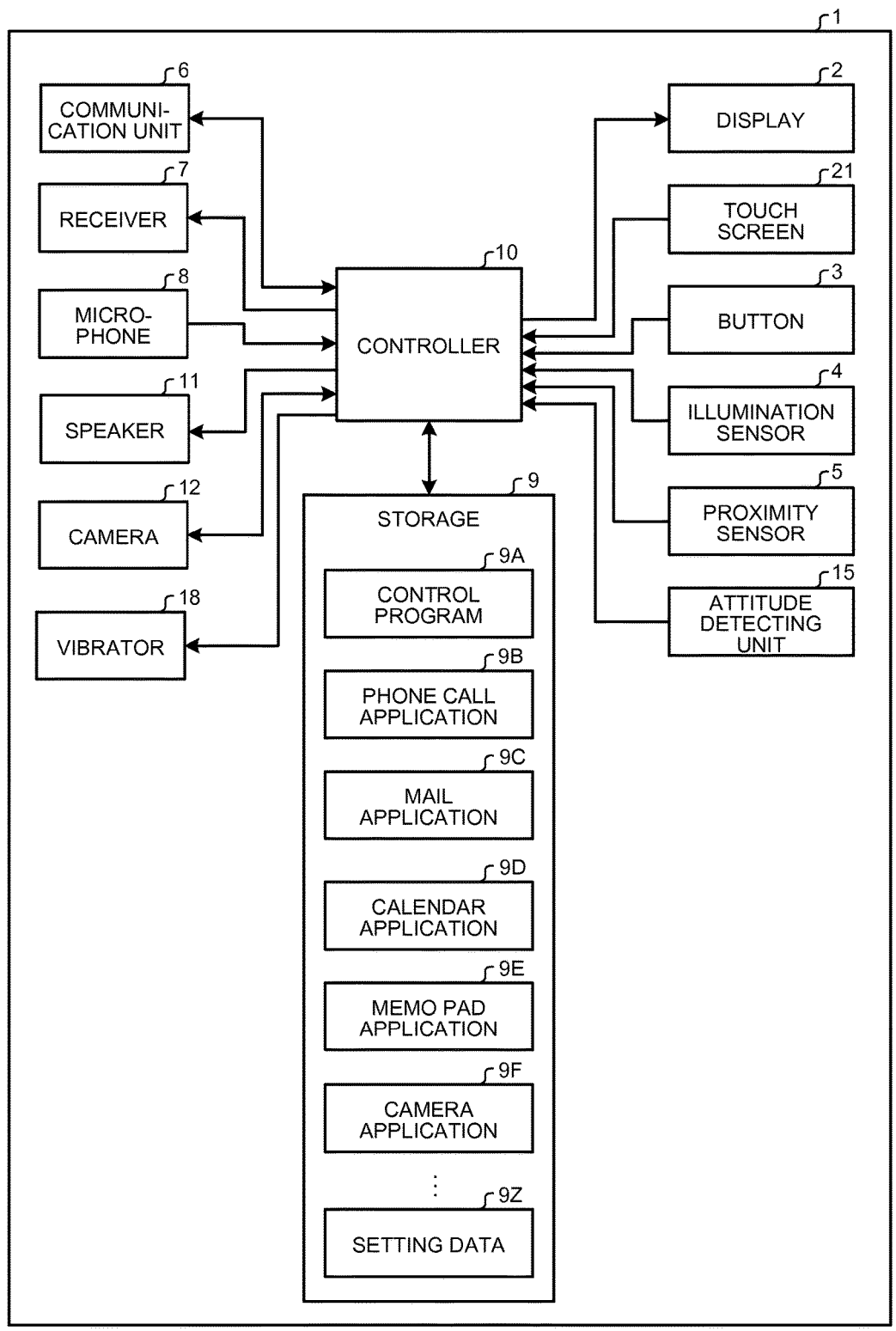
FIG. 1 is a block diagram of a smartphone according to one of embodiments.

A functional configuration of the smartphone 1 according to Embodiment 1 will be explained with reference to FIG. 1. FIG. 1 is a block diagram of the smartphone according to Embodiment 1. In the following explanation, same reference signs may be assigned to similar components. Moreover, overlapping explanation may not be repeated.

As illustrated in FIG. 1, the smartphone 1 includes a display 2, a button 3, an illumination sensor 4, a proximity sensor 5, a communication unit 6, a receiver 7, a microphone 8, a storage 9, a controller 10, a speaker 11, a camera 12, an attitude detecting unit 15, a vibrator 18, and a touch screen 21.

The display 2 includes a display device such as an LCD (Liquid Crystal Display), an OELD (Organic Electro-Luminescence Display), or an IELD (Inorganic Electro-Luminescence Display). The display 2 displays text, images, symbols, graphics, and the like.

The button 3 receives an operation input from a user. The number of buttons 3 may be single or plural.

The illumination sensor 4 detects illumination of the ambient light of the smartphone 1. The illumination indicates intensity, lightness, or brightness of light. The illumination sensor 4 is used, for example, to adjust the brightness of the display 2.

The proximity sensor 5 detects the presence of nearby objects without any physical contact. The proximity sensor 5 detects the presence of the objects based on a change in a magnetic field or a change in a return time of a reflected wave of an ultrasonic wave, etc. The proximity sensor 5 detects that, for example, the display 2 is brought close to someone's face. The illumination sensor 4 and the proximity sensor 5 may be configured as one sensor. The illumination sensor 4 may be used as the proximity sensor.

The communication unit 6 performs communication via a wireless system. A wireless communication standard supported by the communication unit 6 includes, for example, a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication unit 6 may support one or more of the communication standards.

The communication unit 6 receives a radio signal of a predetermined frequency band from a GPS satellite, performs demodulation processing on the received radio signal, and transmits the signal subjected to the processing to the controller 10. The smartphone 1 may provide a discrete communication unit independent from the communication unit 6 by separating the function of communication with the GPS satellite from the communication unit 6.

The receiver 7 is a sound output unit. The receiver 7 outputs a sound signal transmitted from the controller 10 as a sound. The receiver 7 is used, for example, to output a voice of the other party during a call. The microphone 8 is a sound input unit. The microphone 8 converts the voice of the user or the like to a sound signal and transmits the sound signal to the controller 10.

The storage 9 stores programs and data. The storage 9 is used also as a work area for temporarily storing a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

Programs stored in the storage 9 include applications executed in the foreground or the background and a control program for assisting operations of the applications. The application executed in the foreground displays, for example, a screen on the display 2. The control program includes, for example, an OS. The application and the control program may be installed in the storage 9 through wireless communication by the communication unit 6 or through a non-transitory storage medium.

The storage 9 stores, for example, a control program 9A, a phone call application 9B, a mail application 9C, a calendar application 9D, a memo pad application 9E, a camera application 9F, and setting data 9Z.

The control program 9A provides a function related to various controls for operating the smartphone 1. The control program 9A provides a function for displaying, for example, a notification screen including a notification area for notifying the user of information on the display. The notification screen includes a notice display area which is the notification area for notifying the user of detailed information for information to be notified to a so-called status bar about an application executed in the background, and also includes another area(s) other than the notice display area. The other area(s) includes a settings button display area for setting various functions, an app shortcut display area where shortcut icons of applications are laid out, and a "simple post to SNS" display area for messages to be posted to SNS (Social Network Service), and the like.

Moreover, the control program 9A provides a function for shifting, when detecting a user operation, the notification screen displayed on the display 2 to the editing screen for editing the notification screen. Furthermore, the control program 9A provides a function for reflecting, when detecting a user operation of adding an other area(s) in the editing screen, the addition of the other area(s) in the notification screen. Moreover, the control program 9A provides a function for reflecting, when detecting a user operation of deleting an other area(s) in the editing screen, the deletion of the other area(s) in the notification screen. In addition, the control program 9A provides a function for reflecting, when detecting a user operation of mutually changing a display position of the notification area and a display position of the other area(s) in the editing screen, the change of the display positions in the notification screen. Moreover, the control program 9A provides a function for reflecting, when detecting a user operation of changing a component included in the other area(s) in the editing screen, the change of the component in the notification screen.

Additionally, the control program 9A provides a function for implementing communication, by controlling the communication unit 6 and the like, using LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System), etc.

The control program 9A provides a function for implementing short-distance wireless communication, by controlling the communication unit 6 and the like, using IEEE 802.11, Bluetooth (registered trademark), IrDA (Infrared Data Association), NFC (Near Field Communication), and WPAN (Wireless Personal Area Network), etc.

The control program 9A provides a function for making a phone call by, for example, controlling the communication unit 6 and the microphone 8, etc.

The function provided by the control program 9A may be used in combination with a function provided by other program stored in the storage 9, such as the phone call application 9B or the mail application 9C. The function provided by the control program 9A may be divided into a plurality of program modules or may be combined with other program.

The phone call application 9B provides a phone call function for phone calls through wireless communication. The mail application 9C provides an electronic mail function for composition, transmission, reception, display, and the like of electronic mails. The calendar application 9D provides a calendar function for schedule management and the like. The memo pad application 9E provides a text editor function for creation and management of text data. The camera application 9F provides a function for, for example, capturing, editing, and managing images and moving images. The applications stored in the storage 9 are exemplarily illustrated. In addition to the applications illustrated in FIG. 1, a browser application, a navigate application, a music player application, a moving image reproduction application, a calculator application, a tag application, and the like may be stored therein.

The setting data 9Z includes information on various settings and processing related to the operations of the smartphone 1.

The controller 10 is a processing unit. Examples of the processing unit include, but are not limited to, a CPU (Central Processing Unit), an SoC (System-on-a-chip), an MCU (Micro Control Unit), and an FPGA (Field-Programmable Gate Array). The controller 10 integrally controls the operations of the smartphone 1 to implement the various functions.

Specifically, the controller 10 executes instructions included in a program stored in the storage 9 while referring to data stored in the storage 9 as necessary. The controller 10 then controls function units according to the data and the instructions to thereby implement the various functions. Examples of the function units include, but are not limited to, the display 2, the communication unit 6, the microphone 8, and the speaker 11. The controller 10 can change the control according to a detection result of a detector. Examples of the detector include, but are not limited to, the button 3, the illumination sensor 4, the proximity sensor 5, the microphone 8, the camera 12, the attitude detecting unit 15, and the touch screen 21.

The controller 10 executes the control program 9A to thereby implement the processing for displaying the notification screen including the notification area for notifying the user of information on the display 2. Specifically, for example, when detecting a touch gesture made by the user, the controller 10 displays the notification screen on the display 2. Even if any screen is displayed on the display 2, the controller 10 can invoke and display the notification screen on the display 2. The controller 10 can invoke and display the notification screen on the display 2 in response to the detection of a touch gesture made by the user when, for example, a so-called home screen is displayed on the display 2. Moreover, the controller 10 can invoke and display the notification screen on the display 2 in response to the detection of the touch gesture made by the user when, for example, the application screen corresponding to the mail application, the browser application, or to a map and a scheduler is displayed on the display 2. Furthermore, the controller 10 can invoke and display the notification screen on the display 2 even if a so-called lock screen, which is displayed when the smartphone 1 is in a locked state, is displayed on the display 2. The locked state may include not only a state not accepting a user operation but also a security locked state. The notification screen includes the notice display area being the notification area for notifying the user of detailed information for information to be notified to the so-called status bar about an application executed in the background, and also includes an other area(s) other than the notice display area. The other area(s) includes the settings button display area for setting various functions, the app shortcut display area where shortcut icons of applications are laid out, and the simple post to SNS display area for messages to be posted to SNS (Social Network Service), and the like.

Furthermore, the controller 10 executes the control program 9A to thereby implement, when detecting a user operation, the processing for shifting the notification screen displayed on the display 2 to the editing screen for editing the notification screen. For example, when detecting an operation performed on an Edit button provided on the notification screen, the controller 10 shifts the notification screen displayed on the display 2 to the editing screen.

Moreover, the controller 10 executes the control program 9A to thereby implement, when detecting a user operation of adding an other area(s) in the editing screen, the processing for reflecting the addition of the other area(s) in the notification screen. Furthermore, the controller 10 executes the control program 9A to thereby implement the processing for reflecting, when detecting a user operation of deleting an other area(s) in the editing screen, the deletion of the other area(s) in the notification screen. In addition, the controller 10 executes the control program 9A to thereby implement the processing for reflecting, when detecting a user operation of mutually changing a display position of the notification area and a display position of the other area(s) in the editing screen, the change of the display positions in the notification screen. Moreover, the controller 10 executes the control program 9A to thereby implement the processing for reflecting, when detecting a user operation of changing a component included in the other area(s) in the editing screen, the change of the component in the notification screen.

The speaker 11 is a sound output unit. The speaker 11 outputs a sound signal transmitted from the controller 10 as a sound. The speaker 11 is used to output, for example, a ring tone and music. Either one of the receiver 7 and the speaker 11 may have the other function.

The camera 12 converts a photographed image to an electric signal. The camera 12 includes, for example, an in-camera for photographing an object facing the display 2 and an out-camera for photographing an object facing the opposite side of the display 2.

The attitude detecting unit 15 detects an attitude of the smartphone 1. The attitude detecting unit 15 includes at least one of an acceleration sensor, a direction sensor, and a gyroscope in order to detect its attitude.

The vibrator 18 vibrates part or whole of the smartphone 1. The vibrator 18 includes, for example, a piezoelectric element or an eccentric motor in order to generate vibration. The vibration generated by the vibrator 18 is used to inform the user of various events such as incoming calls.

The touch screen 21 detects a touch on the touch screen 21. The controller 10 (smartphone 1) detects various operations (gestures) performed on the touch screen 21 using a finger, a stylus, a pen, or the like (hereinafter, simply called "finger") based on the touch detected by the touch screen 21. For example, the touch screen 21 includes a touch sensor. The touch sensor detects a touch of the finger on the touch screen 21 together with a position of the touched location on the touch screen 21, and notifies the controller 10 of the detection. Examples of the various operations (gestures) detected by the controller 10 through the touch screen 21 include, but are not limited to, touch, long touch, release, swipe, tap, double tap, long tap, drag, flick, pinch in, and pinch out. The detection method of the touch screen 21 may be any detection method such as a capacitive type detection method, a resistive type detection method, a surface acoustic wave type (or ultrasonic type) detection method, an infrared type detection method, an electromagnetic induction type detection method, a load sensing type detection method, etc. As illustrated in FIG. 1, the display 2 and the touch screen 21 are functionally separated from each other, but may be integrated physically as a touch screen display.

The functional configuration of the smartphone 1 illustrated in FIG. 1 is exemplarily described and may be modified as required within a scope that does not depart from the gist of the present invention.

One of examples of a display control for the notification screen performed by the smartphone 1 will be explained with reference to FIG. 2 to FIG. 6. Sign F1 appearing in FIG. 2, FIG. 5, and FIG. 6 indicates a user's finger. The following describes examples of the control of when a so-called lock screen is displayed on the display 2; however, the same control can be implemented even if the so-called home screen or the application screen is displayed on the display 2.

Figure 2:
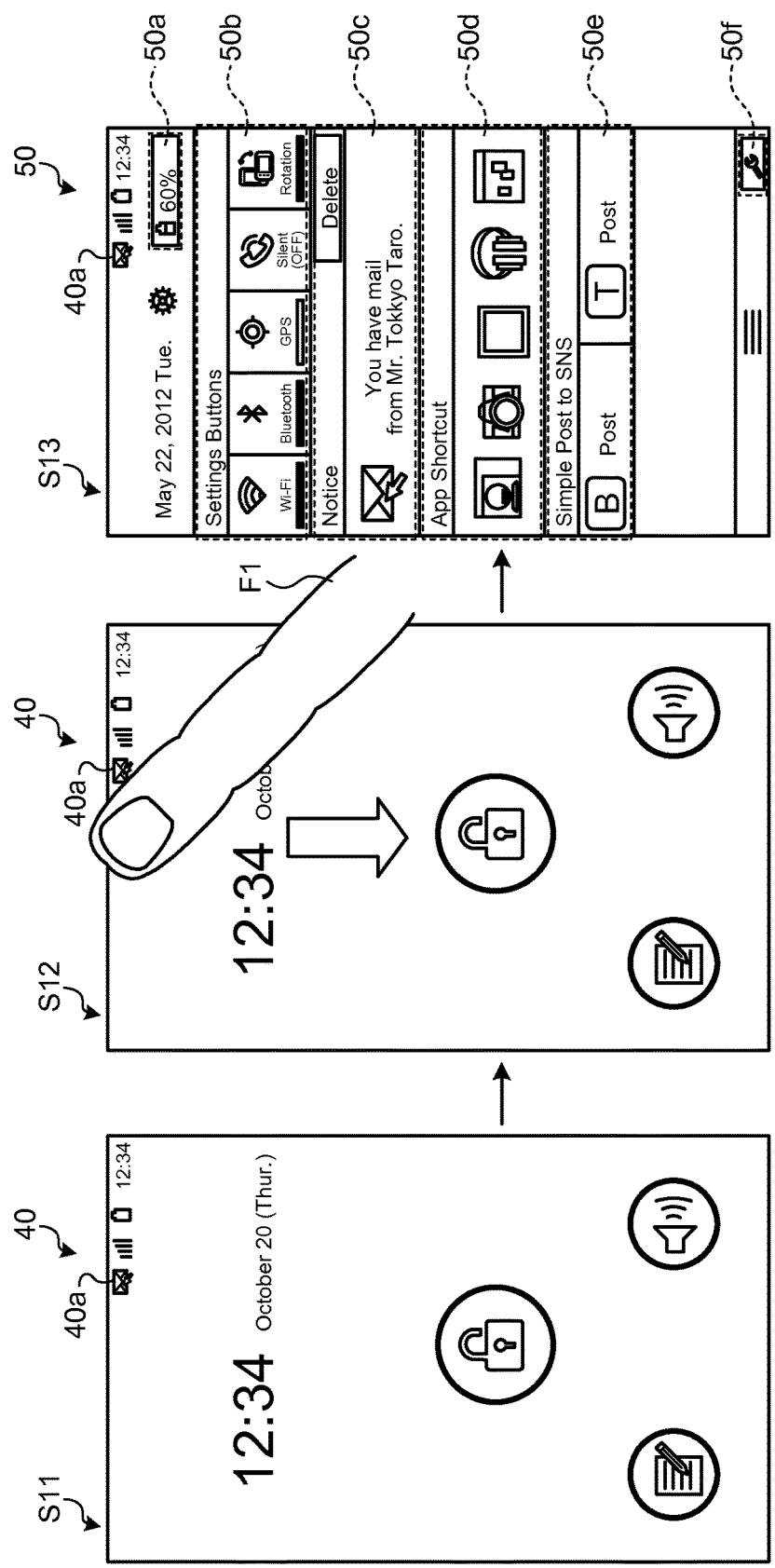
FIG. 2 is a diagram of one of examples of control on how to display a notification screen on a display.

FIG. 2 is a diagram of one of examples of control on how to display the notification screen on the display 2. As illustrated in FIG. 2, the smartphone 1 displays a lock screen 40 on the display 2 (Step S11). The lock screen 40 is displayed when the smartphone 1 is in the locked state. When the lock screen 40 is displayed on the display 2, the smartphone 1 does not accept a user operation except for a specific operation. The specific operation includes, for example, an operation for unlocking the locked state and an operation for displaying the notification screen on the display 2. The locked state may include not only a state of not accepting a user operation but also a security locked state. In the example illustrated in FIG. 2, an icon 40a for notifying the user of reception of a mail is displayed in the so-called status bar provided above the lock screen 40.

Subsequently, when detecting, through the touch screen 21, a swipe from the upper end of the lock screen 40 where the status bar is displayed toward a lower end thereof (Step S12), the smartphone 1 displays a notification screen 50 on the display 2 (Step S13). Provided in the notification screen 50 are an area 50a where a remaining battery level is displayed in percentage, in addition to the icon 40a, a settings button display area 50b for setting various functions, a notice display area 50c being the notification area where detailed information for information displayed in the status bar is displayed, an app shortcut display area 50d where shortcut icons of applications are laid out, a simple post to SNS display area 50e for messages to be posted to SNS, and an Edit button 50f for shifting the notification screen 50 to the editing screen for editing the notification screen 50. In the example illustrated in FIG. 2, a message of "You have mail from Mr. Tokkyo Taro." is displayed in the notice display area 50c. The message is the detailed information corresponding to the icon 40a displayed in the so-called status bar.

Figure 3:
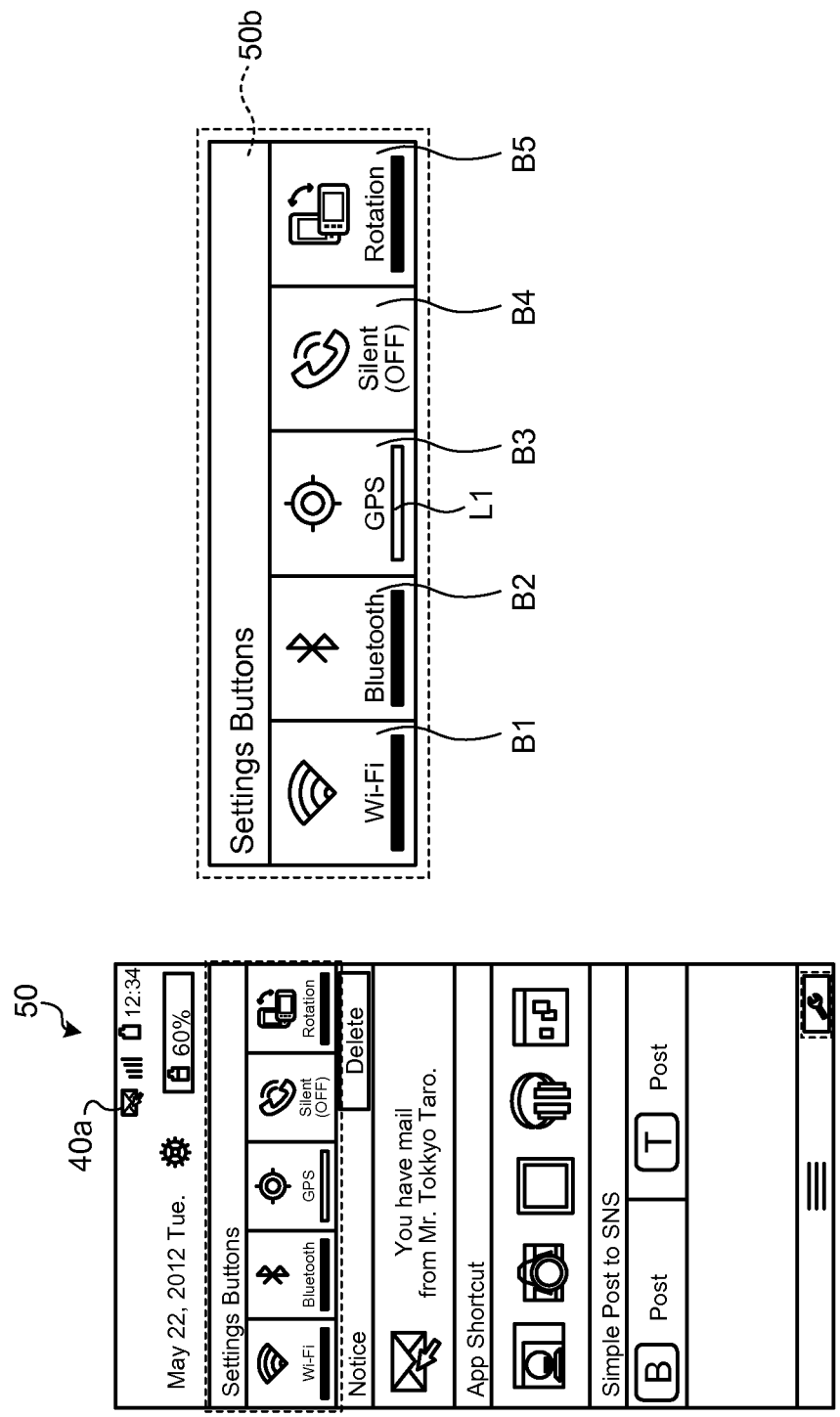
FIG. 3 is an enlarged diagram of a settings button display area.

FIG. 3 is an enlarged diagram of the settings button display area 50b. As illustrated in FIG. 3, the settings button display area 50b includes an area indication bar written as "Settings buttons" and a button B1 to a button B5. The button B1 is a button used to set a WiFi function to be ON or OFF. A button B2 is a button used to set a function of Bluetooth (registered trademark) to be ON or OFF. The button B3 is a button used to set a GPS function to be ON or OFF. The button B4 is a button used to change to an idle mode of a phone. The button B5 is a button used to set a function of screen rotation to be ON or OFF.

When detecting, for example, a tap on the button B3 through the touch screen 21, the controller 10 sets the GPS function to be an ON state if the GPS function corresponding to the button B3 is in an OFF state. Moreover, as illustrated in FIG. 3, the controller 10 lights a character portion of "GPS" indicated on the button B3 and an area L1 indicated on the button B3 so as to represent that the GPS function corresponding to the button B3 is ON. When detecting user operations performed on the button B1, the button B2, and the button B5, the controller 10 can also perform settings similar to the button B3.

Figure 4:
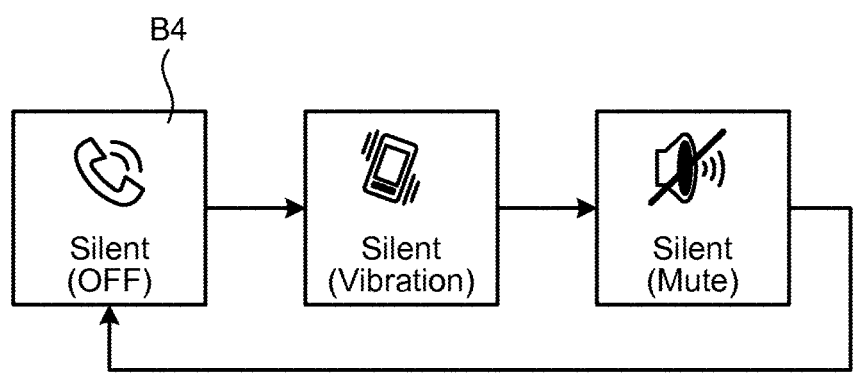
FIG. 4 is a diagram of one of examples of an image corresponding to an idle mode of a phone.

For the button B4, the controller 10 changes to the idle mode of the phone according to a user operation, as explained below, and displays an image corresponding to the changed mode on the button B4. That is, the controller 10 changes an image of the button B4 to an image corresponding to the idle mode of the phone associated with the button B4 to display the changed image each time, for example, a tap on the button B4 is detected through the touch screen 21. FIG. 4 is a diagram of one of examples of images corresponding to the idle mode of the phone. As illustrated in FIG. 4, the controller 10 changes an image of the button B4 to an image of Silent Mode (OFF), an image of Silent Mode (Vibration), and an image of Silent Mode (Mute) each time a tap on the button B4 is detected, and displays the changed image.

In this way, the user operates the button B1 to the button B5 provided in the settings button display area 50b, and can thereby easily set the various functions respectively associated with the button B1 to the button B5 to be ON or OFF.

Figure 5:
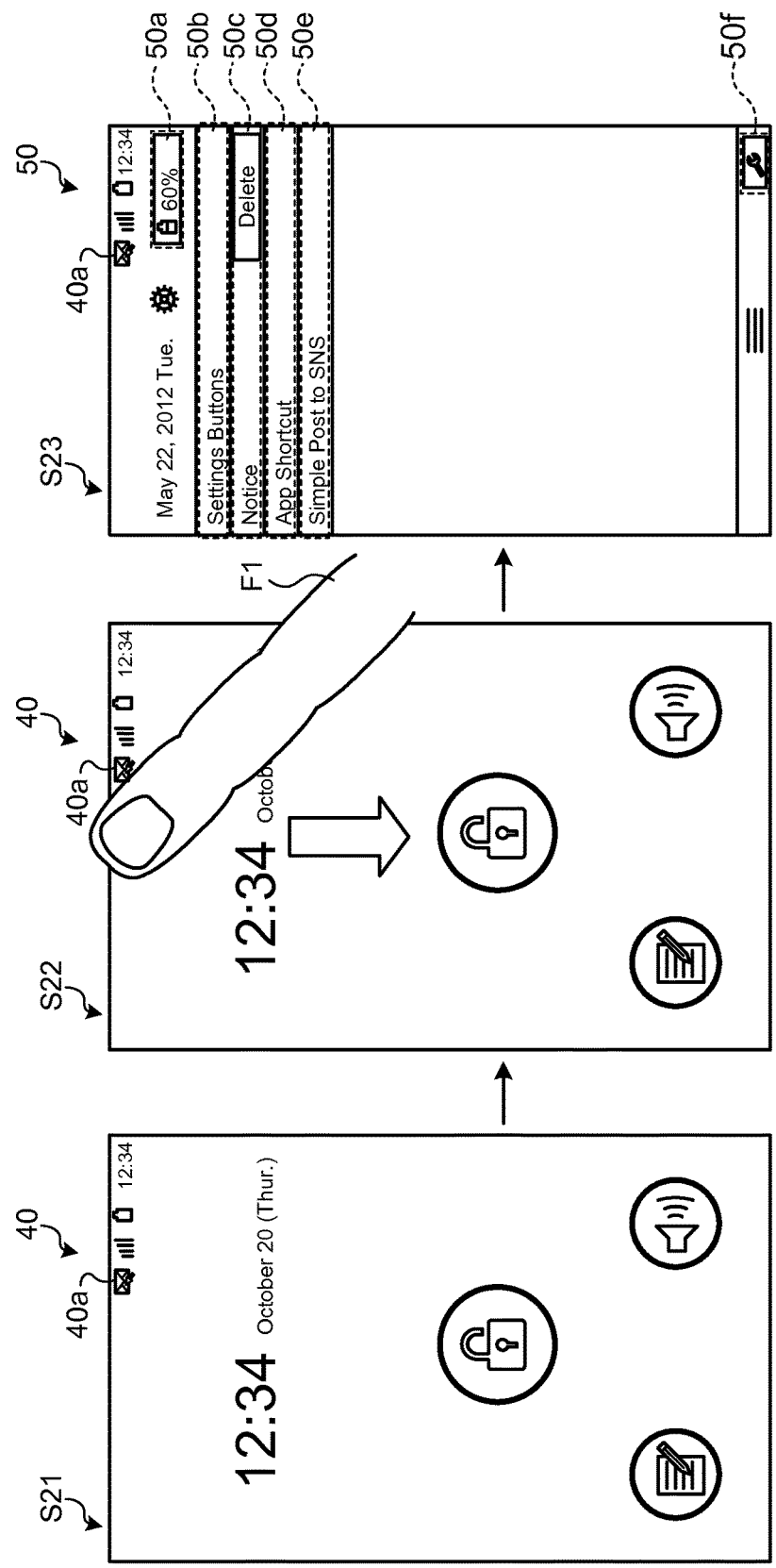
FIG. 5 is a diagram of another example of the control on how to display the notification screen on the display.

FIG. 5 is a diagram of another example of the control on how to display the notification screen on the display. The smartphone 1 may display the notification screen as illustrated in FIG. 5 without limiting to the example illustrated in FIG. 2. In other words, as illustrated in FIG. 5, the smartphone 1 displays an idle screen 40 on the display 2 (Step S21). Subsequently, when detecting a swipe passing from the upper end of the idle screen 40 where the status bar is displayed to the lower end of the idle screen 40 (Step S22), the smartphone 1 displays the notification screen 50 on the display 2 (Step S23). At this time, the smartphone 1 collapses the settings button display area 50b, the notice display area 50c, the app shortcut display area 50d, and the simple post to SNS display area 50e provided in the notification screen 50, and displays only area indication bars corresponding to the respective areas. The smartphone 1 may expand a collapsed area in response to a user operation performed on the area indication bar. This control is explained below.

Figure 6:
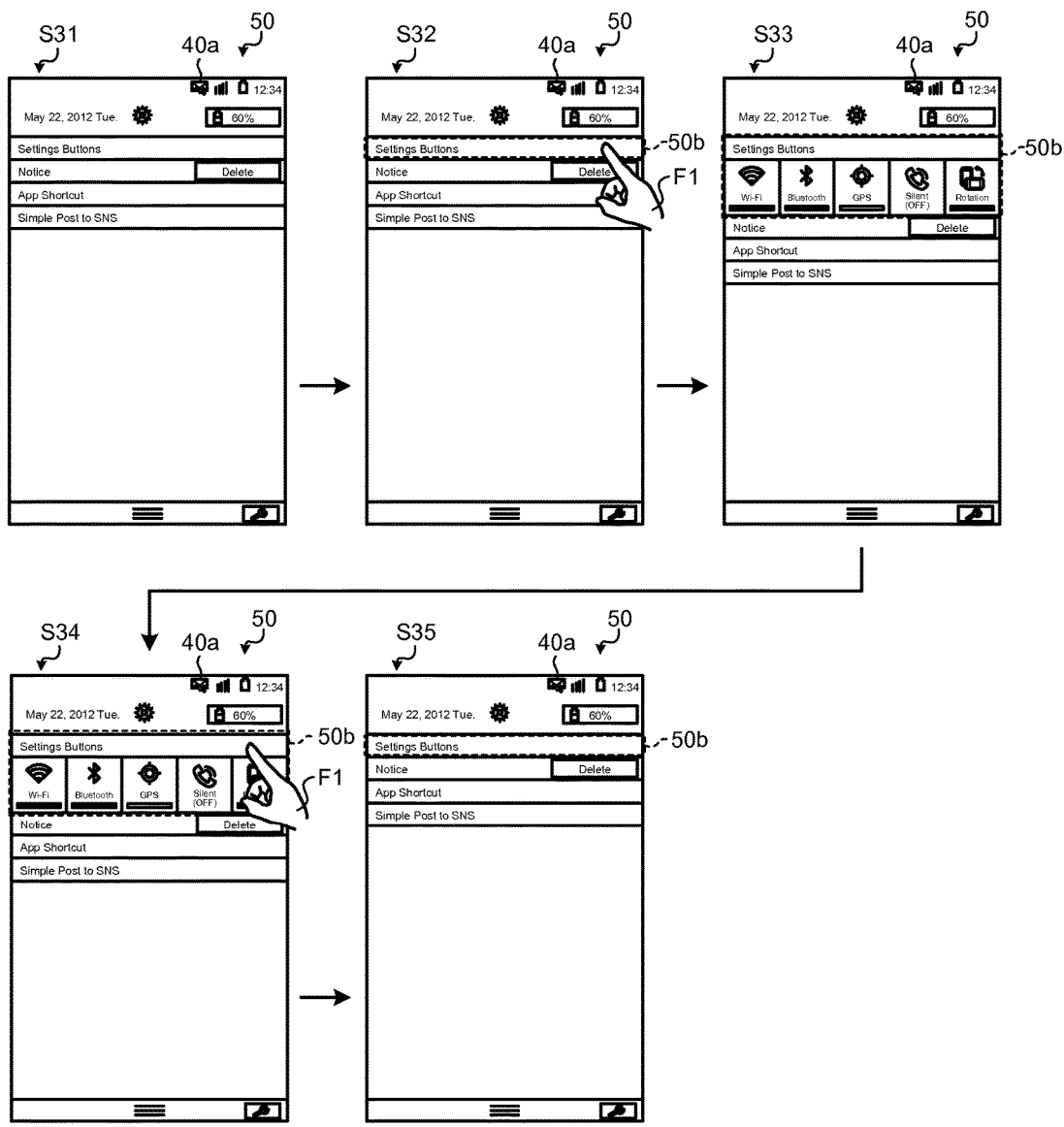
FIG. 6 is a diagram of one of examples of the control performed on the notification screen illustrated in FIG. 5.

FIG. 6 is a diagram of one of examples of the control performed on the notification screen illustrated in FIG. 5. As illustrated in FIG. 6, the smartphone 1 displays the notification screen 50 on the display 2 (Step S31). Subsequently, when detecting a tap on the settings button display area 50b through the touch screen 21 (Step S32), the smartphone 1 expands the collapsed settings button display area 50b (Step S33). Then when detecting a tap on the area indication bar provided above the settings button display area 50b, which is expanded, through the touch screen 21 (Step S34), the smartphone 1 collapses the expanded settings button display area 50b and displays only the area indication bar (Step S35).

One of examples of the control to edit the notification screen performed by the smartphone 1 will be explained with reference to FIG. 7 to FIG. 15. The sign F1 appearing in FIG. 7 to FIG. 15 indicates a user's finger.

Figure 7:
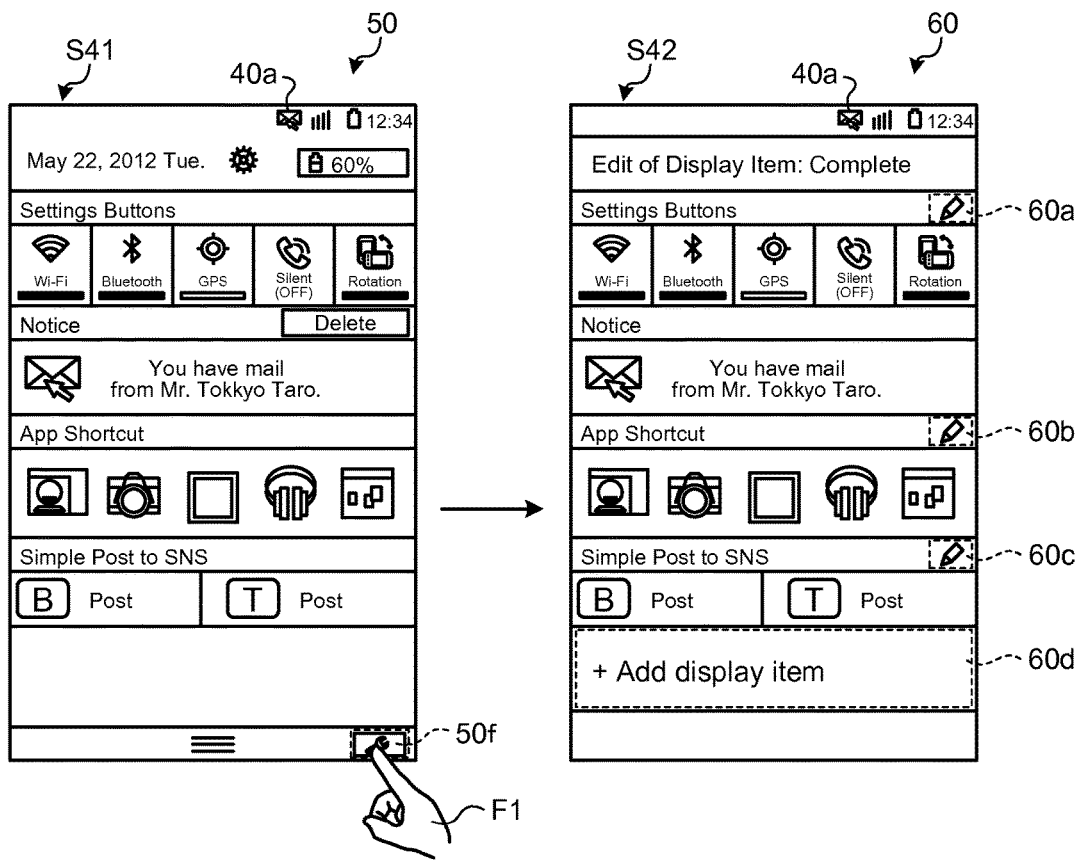
FIG. 7 is a diagram of one of examples of control on how to display an editing screen on the display.

FIG. 7 is a diagram of one of examples of control on how to display an editing screen on the display. As illustrated in FIG. 7, when detecting an operation performed on the Edit button 50f provided in the notification screen 50 displayed on the display 2 through the touch screen 21 (Step S41), the smartphone 1 shifts the notification screen 50 to an editing screen 60 for editing the notification screen 50 (Step S42). As illustrated in FIG. 7, the editing screen 60 is provided with an Edit button 60a for individually editing the settings button display area 50b, an Edit button 60b for individually editing the app shortcut display area 50d, an Edit button 60c for individually editing the simple post to SNS display area 50e, and a display item Add button 60d. The editing screen 60 accepts mainly an editing operation from the user such as addition of a new display item, and deletion or movement of an existing display item. For the notice display area 50c, only the movement is allowed while the deletion is not allowed.

Figure 8:
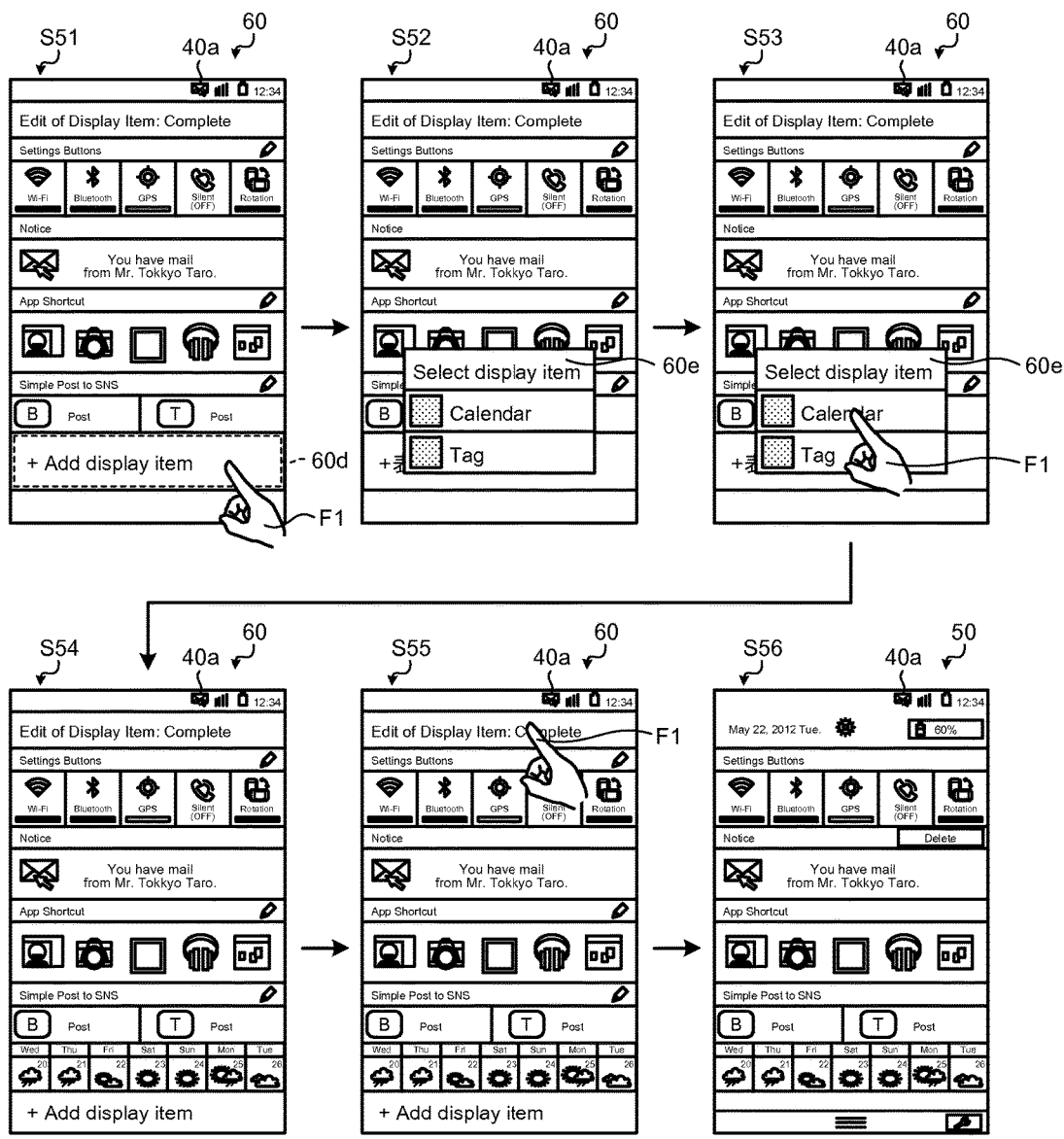
FIG. 8 is a diagram of one of examples of control of when a display item is added in the editing screen.

FIG. 8 is a diagram of one of examples of control of when a display item is added in the editing screen 60. As illustrated in FIG. 8, when detecting an operation performed on the display item Add button 60d provided in the editing screen 60 through the touch screen 21 (Step S51), the smartphone 1 displays a list 60e of addable display items (Step S52). In the example illustrated in FIG. 8, for example, Calendar and Tag are listed as the addable display items. Only the list of addable display items may be displayed in the list 60e of display items, or all the items being displayed and items that can be displayed may be displayed therein.

Subsequently, when detecting a selection of the calendar from the list 60e of addable display items through the touch screen 21 (Step S53), the smartphone 1 adds the calendar to the editing screen 60 (Step S54). In the example illustrated in FIG. 8, a weekly calendar including weather information is displayed; however, a monthly calendar may be displayed.

Then, when detecting an operation performed on an area indicated as "Edit of Display Item: Complete" in the editing screen 60 through the touch screen 21 (Step S55), the smartphone 1 displays the notification screen 50 to which the calendar is added on the display 2 (Step S56). The operation performed on the area indicated as "Edit of Display Item: Complete" may be any operation as an object to be detected, such as touch, tap, swipe, and double tap, unless the association with any other processing overlaps the operation. In the description herein below, the same goes for any operation simply described as "operation".

Figure 9:
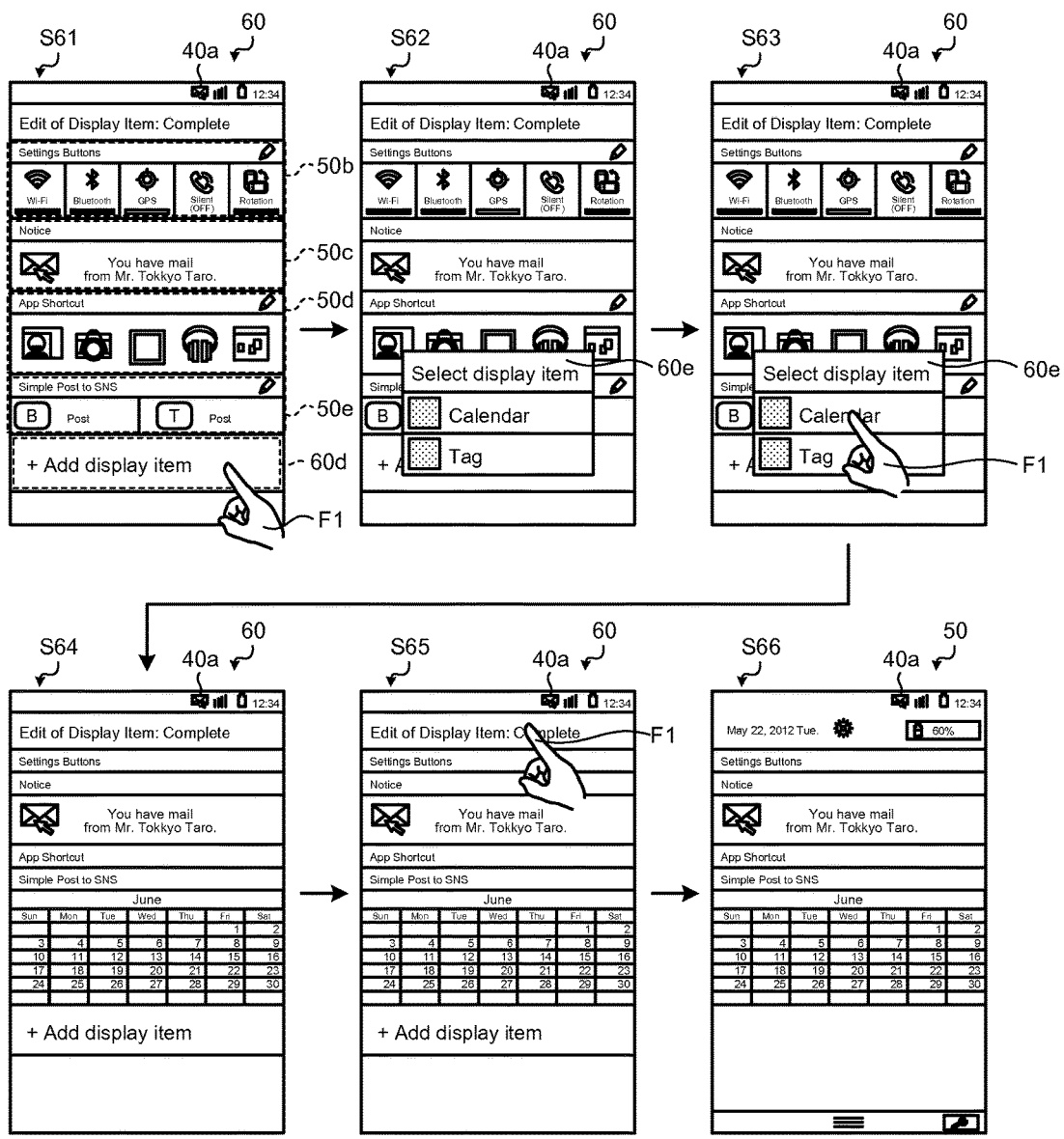
FIG. 9 is a diagram of another example of the control of when the display item is added in the editing screen.
Figure 10:
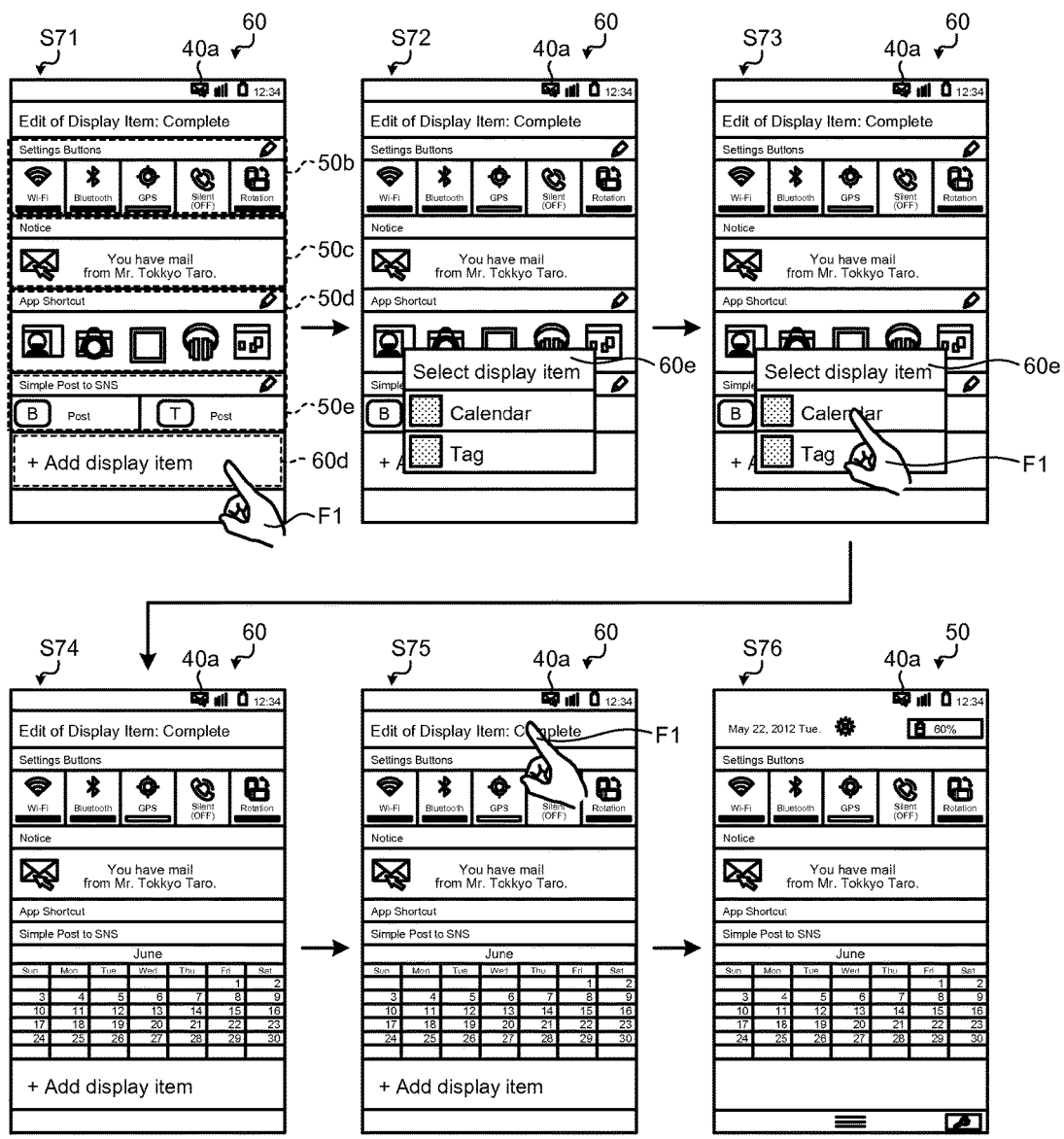
FIG. 10 is a diagram of another example of the control of when the display item is added in the editing screen.

FIG. 9 and FIG. 10 are diagrams of other examples of the control of when a display item is added in the editing screen 60.

The control to collapse the areas except for the notice display area 50c and display only the area indication bars thereof when a display item is to be added will be explained with reference to FIG. 9.

As illustrated in FIG. 9, when detecting an operation performed on the display item Add button 60d provided in the editing screen 60 through the touch screen 21 (Step S61), the smartphone 1 displays the list 60e of addable display items (Step S62).

Subsequently, when detecting a selection of the calendar from the list 60e of addable display items through the touch screen 21 (Step S63), the smartphone 1 displays the calendar in the editing screen 60 (Step S64). At Step S64, the smartphone 1 determines whether the total of areas, obtained by combining an existing area in the editing screen 60 and an area of the calendar to be added, exceeds a display possible range of the display 2. When it is determined that the total exceeds the display possible range of the display 2, the smartphone 1 collapses the settings button display area 50b, the app shortcut display area 50d, and the simple post to SNS display area 50e and displays only the area indication bars thereof, except for the notice display area 50c. At this time, the smartphone 1 does not allow the individual Edit buttons to be displayed in the area indication bars. The smartphone 1 again displays the individual Edit buttons when the collapsed areas are expanded in response to an operation performed on the area indication bar. When the total of the areas obtained by combining the existing area in the editing screen 60 and the area of the calendar to be added exceeds the display possible range of the display 2, the smartphone 1 may collapse all the areas including the notice display area 50c, and display only the area indication bars thereof.

Meanwhile, at Step S64, when the total of the areas obtained by combining the existing area in the editing screen 60 and the area of the calendar to be added does not exceed the display possible range of the display 2, the smartphone 1 also displays the settings button display area 50b, the app shortcut display area 50d, and the simple post to SNS display area 50e other than the notice display area 50c without being collapsed.

Subsequently, when detecting an operation performed on the area indicated as "Edit of Display Item: Complete" in the editing screen 60 through the touch screen 21 (Step S65), the smartphone 1 displays the notification screen 50 to which the calendar is added on the display 2 (Step S66). At Step S66, the smartphone 1 collapses the settings button display area 50b, the app shortcut display area 50d, and the simple post to SNS display area 50e and displays only the area indication bars thereof on the notification screen 50, except for the notice display area 50c are.

The control to collapse the areas except for the notice display area 50c and the settings button display area 50b and display only the area indication bars thereof when a display item is to be added will be explained with reference to FIG. 10.

As illustrated in FIG. 10, when detecting an operation performed on the display item Add button 60d provided in the editing screen 60 through the touch screen 21 (Step S71), the smartphone 1 displays the list 60e of addable display items (Step S72).

Subsequently, when detecting a selection of the calendar from the list 60e of addable display items through the touch screen 21 (Step S73), the smartphone 1 displays the calendar in the editing screen 60 (Step S74). At Step S74, the smartphone 1 determines whether the total of areas, obtained by combining an existing area in the editing screen 60 and the area of the calendar to be added, exceeds the display possible range of the display 2. When it is determined that the total exceeds the display possible range of the display 2, the smartphone 1 determines which area can be displayed in addition to the notice display area 50c within the display possible range of the display 2 in order from the settings button display area 50b displayed in the editing screen 60. When it is determined that the area up to the settings button display area 50b can be displayed in addition to the notice display area 50c, the smartphone 1 collapses the app shortcut display area 50d and the simple post to SNS display area 50e except for the notice display area 50c and the settings button display area 50b, and displays only the area indication bars thereof. At this time, the smartphone 1 does not allow the individual Edit buttons to be displayed in the area indication bars. The smartphone 1 again displays the individual Edit button when the collapsed area is expanded in response to an operation performed on the area indication bar. When the area obtained by combining the existing area in the editing screen 60 and the area of the calendar to be added exceeds the display possible range of the display 2, the smartphone 1 may collapse all the areas including the notice display area 50c, and display only the area indication bars thereof.

Meanwhile, at Step S74, when the area obtained by combining the existing area in the editing screen 60 and the area of the calendar to be added does not exceed the display possible range of the display 2, the smartphone 1 also displays the settings button display area 50b, the app shortcut display area 50d, and the simple post to SNS display area 50e other than the notice display area 50c without being collapsed.

Subsequently, when detecting an operation performed on the area indicated as "Edit of Display Item: Complete" in the editing screen 60 through the touch screen 21 (Step S75), the smartphone 1 displays the notification screen 50 to which the calendar is added on the display 2 (Step S76). At Step S76, the smartphone 1 collapses the app shortcut display area 50d and the simple post to SNS display area 50e and displays only the area indication bars thereof in the notification screen 50, except for the notice display area 50c and the settings button display area 50b.

Figure 11:
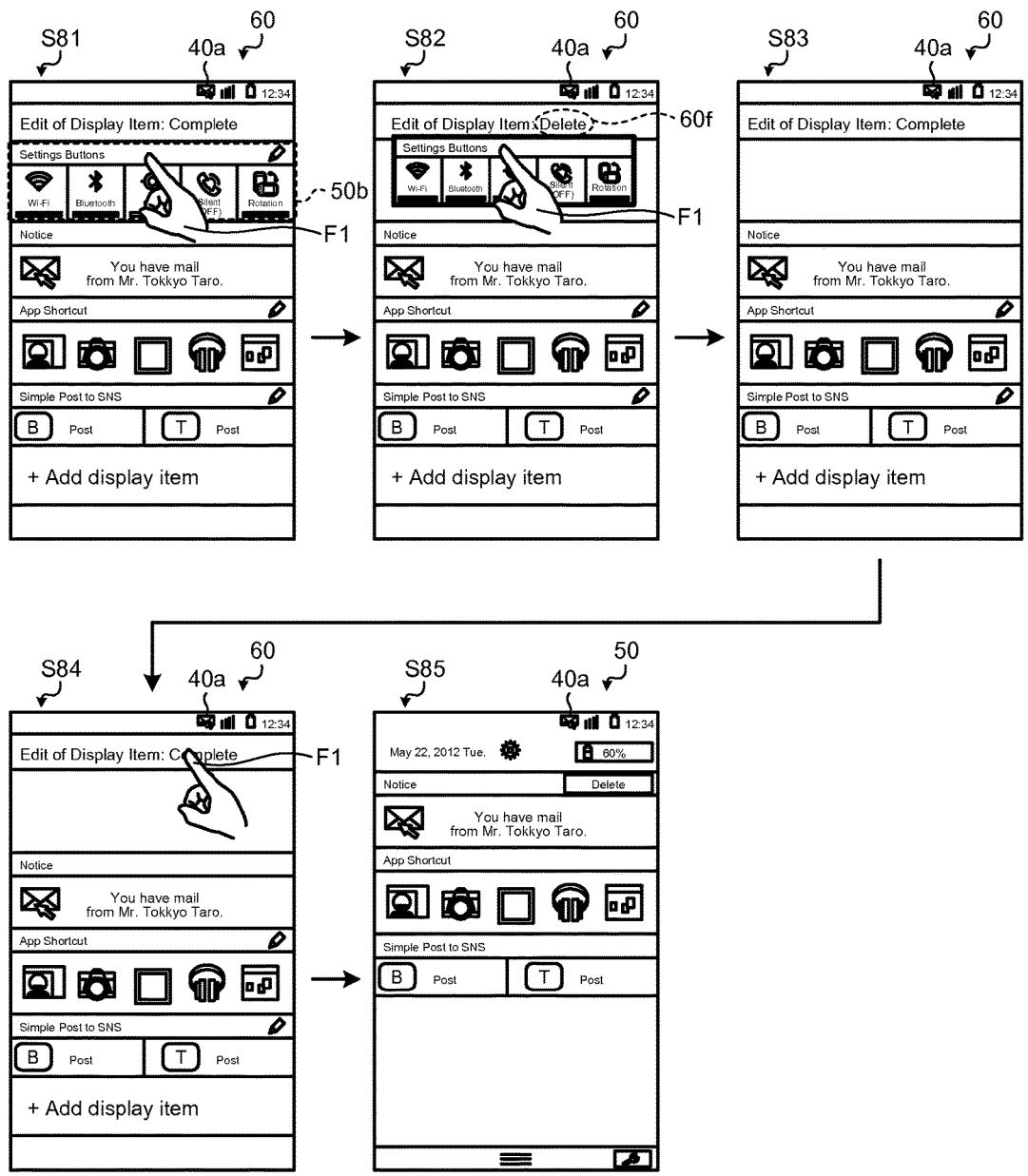
FIG. 11 is a diagram of one of examples of control of when a display item is deleted in the editing screen.

FIG. 11 is a diagram of one of examples of control of when a display item is deleted in the editing screen 60.

As illustrated in FIG. 11, when detecting an operation performed on the area indication bar in the settings button display area 50b of the editing screen 60 through the touch screen 21 (Step S81), the smartphone 1 changes the settings button display area 50b to be a movable state (Step S82). For example, when detecting a long touch on the area indication bar, the smartphone 1 changes the state of the settings button display area 50b to the movable state in which the area can be dragged while being touched. The user operation of changing the settings button display area 50b to the movable state is not limited to the long touch. For example, the smartphone 1 may change the settings button display area 50b to the movable state when detecting a double tap on the area indication bar. The operation may be any operation as an object to be detected unless the association with any other processing overlaps the operation. The same goes for the following explanation. The operation is not limited to the example of changing the settings button display area 50b to the movable state by an operation performed on the area indication bar, and a button or the like for changing the settings button display area 50b to the movable state may be provided.

At Step S82, after the change of the settings button display area 50b to the movable state, the smartphone 1 changes the area indicated as "Edit of Display Item: Complete" in the editing screen 60 to an area for deleting the settings button display area 50b, and changes the indication to "Edit of Display Item: Delete (see 60f)".

When detecting, after the movement of the settings button display area 50b is started by the user, an overlap between an area indicated as "Edit of Display Item: Delete" and the settings button display area 50b in the editing screen 60 through the touch screen 21, the smartphone 1 deletes the settings button display area 50b (Step S83). The smartphone 1 can arbitrarily change the degree of overlap between the area indicated as "Edit of Display Item: Delete" and the settings button display area 50b. For example, if the area indicated as "Edit of Display Item: Delete" and the settings button display area 50b overlap each other even a little, the smartphone 1 may delete the settings button display area 50b. Alternatively, if more than half of the area of the area indicated as "Edit of Display Item: Delete" and the area of the settings button display area 50b overlap each other, the smartphone 1 may delete the settings button display area 50b.

At Step S83, the smartphone 1 deletes the settings button display area 50b and then returns the indication of the area indicated as "Edit of Display Item: Delete" to the indication of "Edit of Display Item: Complete".

Subsequently, when detecting an operation performed on the area indicated as "Edit of Display Item: Complete" in the editing screen 60 through the touch screen 21 (Step S84), the smartphone 1 displays the notification screen 50, from which the settings button display area 50b is deleted, on the display 2 (Step S85).

For the app shortcut display area 50d and the simple post to SNS display area 50e, the smartphone 1 can also delete the display items by the same control as the control illustrated in FIG. 11.

Figure 12:
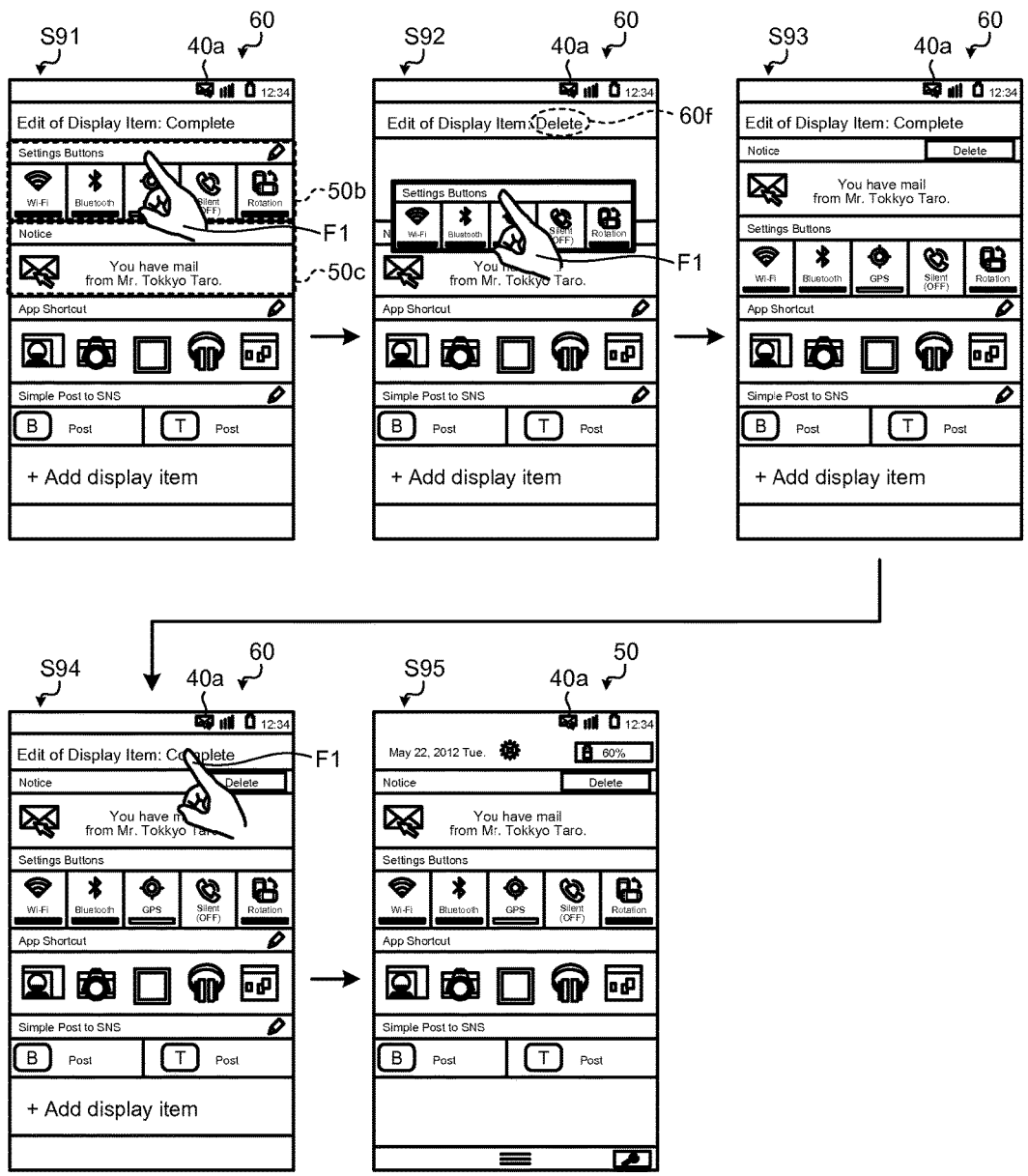
FIG. 12 is a diagram of one of examples of control of when a display position of a display item is changed in the editing screen.

FIG. 12 is a diagram of one of examples of control of when a display position of a display item is changed in the editing screen.

As illustrated in FIG. 12, when detecting an operation performed on the area indication bar in the settings button display area 50b of the editing screen 60 through the touch screen 21 (Step S91), the smartphone 1 changes the settings button display area 50b to be a movable state (Step S92). For example, when detecting a long touch on the area indication bar, the smartphone 1 changes the state of the settings button display area 50b to the movable state in which the area can be dragged while being touched. The user operation of changing the settings button display area 50b to the movable state is not limited to the long touch. For example, the smartphone 1 may change the settings button display area 50b to the movable state when detecting a double tap on the area indication bar. The operation may be any operation as an object to be detected unless the association with any other processing overlaps the operation. The same goes for the following explanation. The operation is not limited to the example of changing the settings button display area 50b to the movable state by an operation performed on the area indication bar, and a button or the like for changing the settings button display area 50b to the movable state may be provided.

At Step S92, after the change of the settings button display area 50b to the movable state, the smartphone 1 changes the area indicated as "Edit of Display Item: Complete" in the editing screen 60 to the area for deleting the display item of the settings button display area 50b, and changes the indication to "Edit of Display Item: Delete (see 60f)".

When detecting, after the movement of the settings button display area 50b is started by the user, an overlap between the settings button display area 50b in the editing screen 60 and the notice display area 50c in the editing screen 60 through the touch screen 21, the smartphone 1 exchanges the display positions between the settings button display area 50b and the notice display area 50c (Step S93).

At Step S93, after the exchange between the display position of the settings button display area 50b and the display position of the notice display area 50c, the smartphone 1 again displays the area indicated as "Edit of Display Item: Complete" changed from the area indicated as "Edit of Display Item: Delete" in the editing screen 60.

Subsequently, when detecting an operation performed on the area indicated as "Edit of Display Item: Complete" in the editing screen 60 through the touch screen 21 (Step S94), the smartphone 1 displays the notification screen 50, in which the display position of the settings button display area 50b and the display position of the notice display area 50c are exchanged each other, on the display 2 (Step S95).

For the app shortcut display area 50d and the simple post to SNS display area 50e, the smartphone 1 can also change the display positions of display items by the same control as the control illustrated in FIG. 12.

Figure 13:
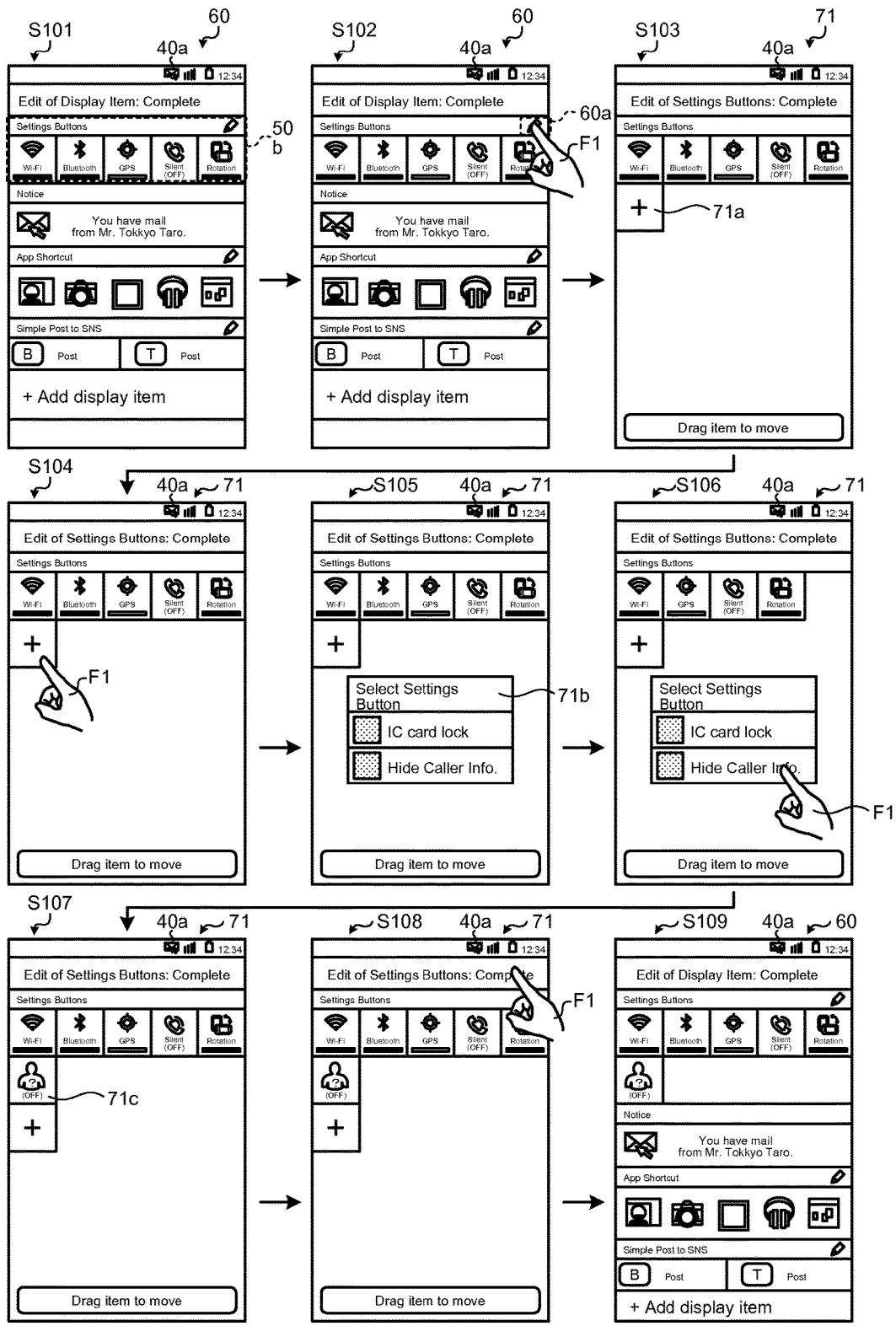
FIG. 13 is a diagram of one of examples of control of when a display item is individually edited in the editing screen.
Figure 14:
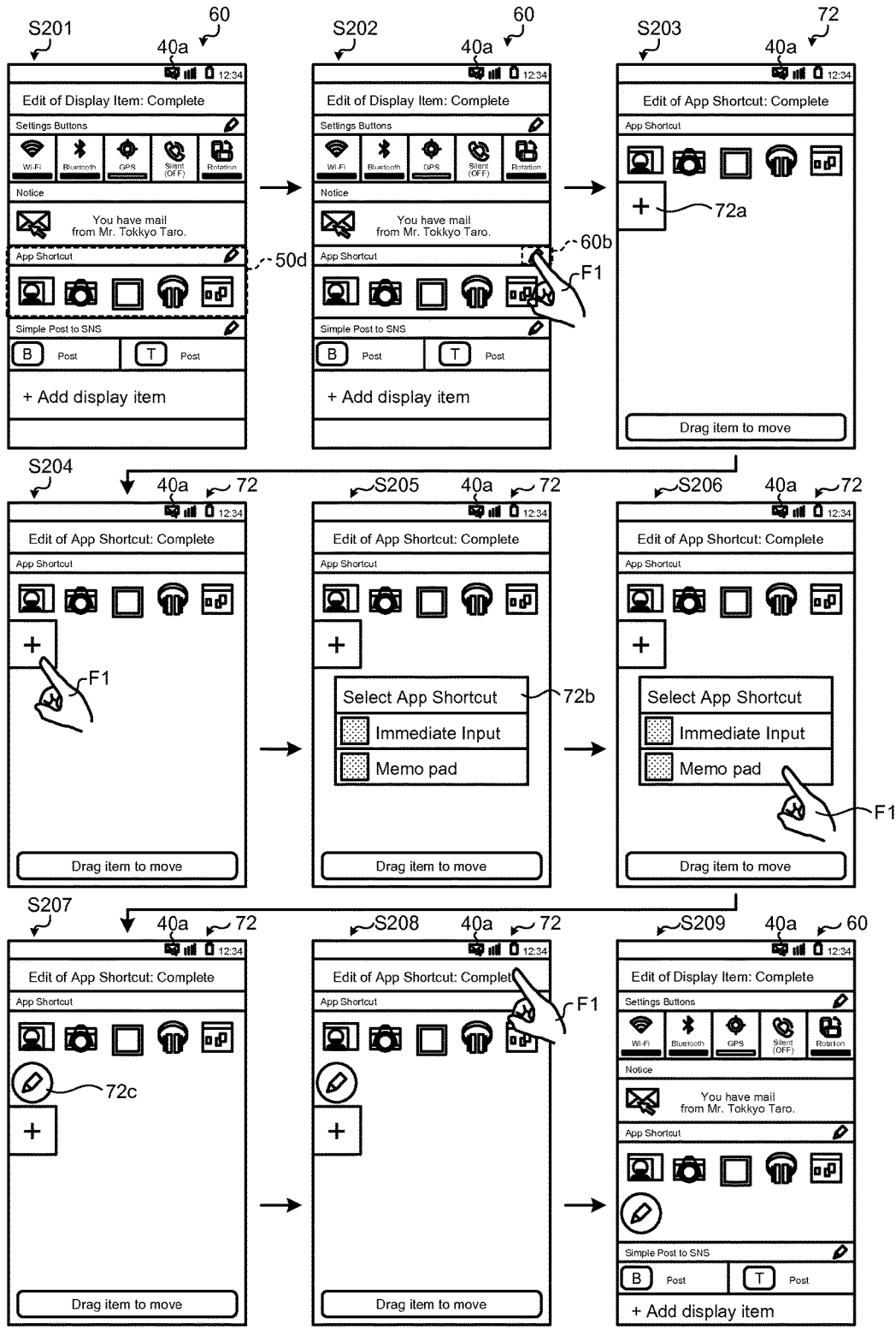
FIG. 14 is a diagram of one of examples of control of when a display item is individually edited in the editing screen.
Figure 15:
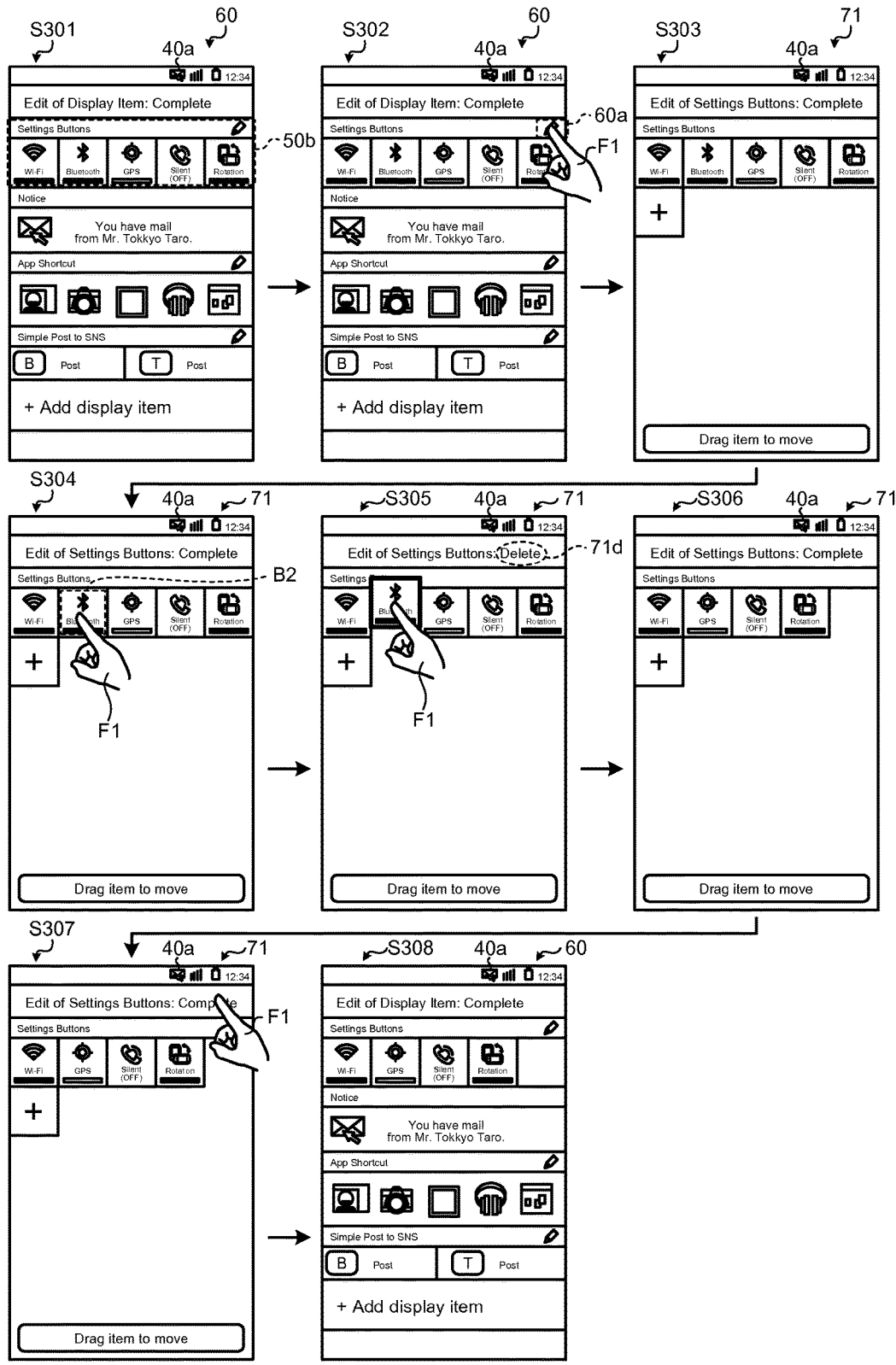
FIG. 15 is a diagram of one of examples of control of when a display item is individually edited in the editing screen.

FIG. 13 to FIG. 15 are diagrams of examples of control of when a display item is individually edited in the editing screen 60.

The control to add a button to the settings button display area 50b will be explained with reference to FIG. 13.

As illustrated in FIG. 13, when detecting, after the display of the editing screen 60 (Step S101), an operation performed on the Edit button 60a provided in the settings button display area 50b through the touch screen 21 (Step S102), the smartphone 1 displays an individual editing screen 71 of the settings button display area 50b (Step S103). The individual editing screen 71 is provided with an Add button 71a to add a button.

Subsequently, when detecting an operation performed on the Add button 71a through the touch screen 21 (Step S104), the smartphone 1 displays a list 71b of addable buttons (Step S105). In the example illustrated in FIG. 13, for example, IC card lock and Hide Caller Info. are listed as the Addable buttons. Only the list of addable buttons may be displayed in the list 71b of buttons, or all the buttons being displayed and addable buttons may be displayed therein.

Then, when detecting a selection of Hide Caller Info. from the list 71b of addable buttons through the touch screen 21 (Step S106), the smartphone 1 displays a button 71c corresponding to Hide Caller Info. in the individual editing screen 71 (Step S107).

Subsequently, when detecting an operation performed on an area indicated as "Edit of Settings Button: Complete" in the individual editing screen 71 through the touch screen 21 (Step S108), the smartphone 1 displays the editing screen 60, to which the button 71c corresponding to Hide Caller Info. is added, on the display 2 (Step S109). Thereafter, when detecting an operation performed on the area indicated as "Edit of Display Item: Complete" in the editing screen 60, the smartphone 1 displays the notification screen 50, in which the button 71c corresponding to Hide Caller Info. is added to the settings button display area 50b, on the display 2.

The control to add a button of the app shortcut display area 50d will be explained with reference to FIG. 14.

As illustrated in FIG. 14, when detecting, after the display of the editing screen 60 (Step S201), an operation performed on the Edit button 60b provided in the app shortcut display area 50d through the touch screen 21 (Step S202), the smartphone 1 displays an individual editing screen 72 of the app shortcut display area 50d (Step S203). The individual editing screen 72 is provided with an Add button 72a to add a button.

Subsequently, when detecting an operation performed on the Add button 72a through the touch screen 21 (Step S204), the smartphone 1 displays a list 72b of addable icons (Step S205). In the example illustrated in FIG. 14, for example, Immediate input and Memo pad are listed as the addable buttons. Only the list of addable icons may be displayed in the list 72b of icons, or all the icons being displayed and addable icons may be displayed therein.

Then, when detecting a selection of Memo pad from the list 72b of addable icons through the touch screen 21 (Step S206), the smartphone 1 displays an icon 72c corresponding to Memo pad in the individual editing screen 72 (Step S207).

Subsequently, when detecting an operation performed on an area indicated as "Edit of App shortcut: Complete" in the editing screen 60 through the touch screen 21 (Step S208), the smartphone 1 displays the editing screen 60, to which the icon 72c corresponding to Memo pad is added, on the display 2 (Step S209). Thereafter, when detecting an operation performed on the area indicated as "Edit of Display Item: Complete" in the editing screen 60, the smartphone 1 displays the notification screen 50, in which the icon 72c corresponding to Memo pad is added to the app shortcut display area 50d, on the display 2.

For the simple post to SNS display area 50e, the smartphone 1 can also perform individual editing by the same control as the control illustrated in FIG. 13 and FIG. 14.

The control to delete a button from the settings button display area 50b will be explained with reference to FIG. 15.

As illustrated in FIG. 15, when detecting, after the display of the editing screen 60 (Step S301), an operation performed on the Edit button 60a provided in the settings button display area 50b through the touch screen 21 (Step S302), the smartphone 1 displays the individual editing screen 71 of the settings button display area 50b (Step S303).

Subsequently, when detecting an operation performed on the button B2 for setting a function of Bluetooth (registered trademark) to be ON or OFF through the touch screen 21 (Step S304), the smartphone 1 changes the button B2 to be a movable state (Step S305). For example, when detecting a long touch on the button B2, the smartphone 1 changes the state of the button B2 to the movable state in which the button can be dragged while being touched.

At Step S305, the smartphone 1 changes the button B2 to the movable state, and then changes the area indicated as "Edit of Settings Button: Complete" in the individual editing screen 71 to the area for deleting the button in the settings button display area 50b, and changes the indication to "Edit of Settings Button: Delete (see 71d)".

When detecting, after the movement of the button B2 is started by the user, an overlap between an area indicated as "Edit of Settings Button: Delete" and the button B2 in the individual editing screen 71 through the touch screen 21, the smartphone 1 deletes the button B2 (Step S306).

Subsequently, when detecting an operation performed on the area indicated as "Edit of Settings Button: Complete" in the individual editing screen 71 through the touch screen 21 (Step S307), the smartphone 1 displays the editing screen 60 from which the button B2 is deleted on the display 2 (Step S308). Thereafter, when detecting an operation performed on the area indicated as "Edit of Display Item: Complete" in the editing screen 60, the smartphone 1 displays the notification screen 50, in which the button B2 is deleted from the settings button display area 50b, on the display 2.

For the app shortcut display area 50d and the simple post to SNS display area 50e, the smartphone 1 can also perform individual editing by the same control as the control illustrated in FIG. 15.

The example of deleting a button being a component in the settings button display area 50b has been explained in FIG. 15; however, the display position of a button can also be changed similarly to the control of the display item illustrated in FIG. 12. The same goes for the app shortcut display area 50d and the simple post to SNS display area 50e.

Examples of processing procedures performed by the smartphone 1 will be explained with reference to FIG. 16 to FIG. 20. The processing procedures illustrated in FIG. 16 to FIG. 20 are implemented by the controller 10 executing the control program 9A and the like stored in the storage.

Figure 16:
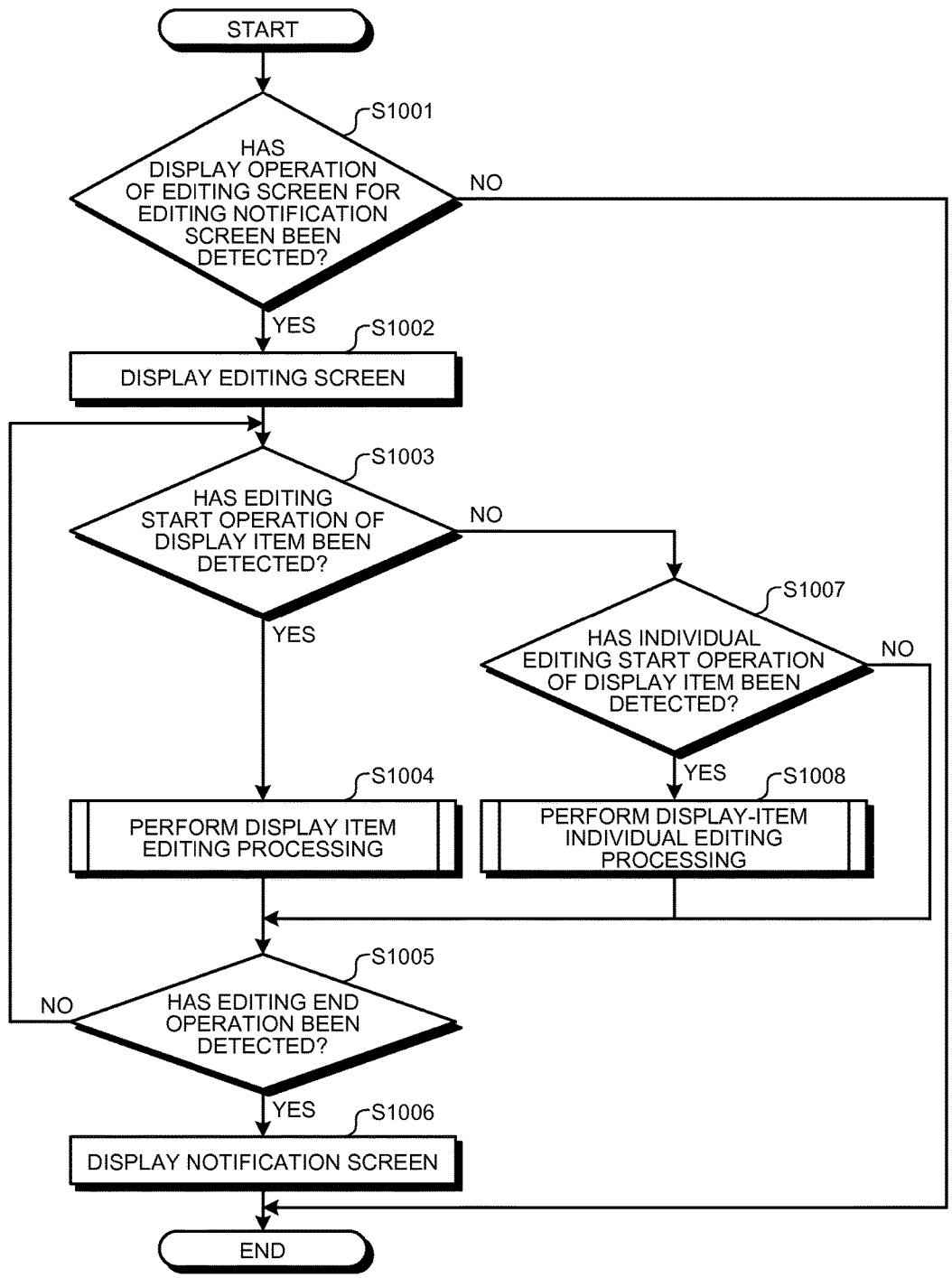
FIG. 16 is a flowchart of an overall control flow of when the notification screen is edited.

FIG. 16 is a flowchart of an overall control flow of when the notification screen is edited. As illustrated in FIG. 16, the controller 10 determines whether a display operation of the editing screen for editing the notification screen has been detected through the touch screen 21 (Step S1001). For example, when detecting an operation performed on the Edit button 50f provided in the notification screen 50, the controller 10 determines that the display operation of the editing screen has been detected.

When it is determined that the display operation of the editing screen for editing the notification screen has not been detected (No at Step S1001), the controller 10 ends the processing without further performing the processing procedure illustrated in FIG. 16.

Meanwhile, when it is determined that the display operation of the editing screen for editing the notification screen has been detected (Yes at Step S1001), the controller 10 displays the editing screen 60 on the display 2 (Step S1002).

Subsequently, the controller 10 determines whether an editing start operation of the display item has been detected (Step S1003). For example, when detecting an operation performed on the display item Add button 60d, the controller 10 determines that the editing start operation of the display item has been detected. Alternatively, when detecting an operation performed on any one of the area indication bars respectively corresponding to the areas of the settings button display area 50b, the app shortcut display area 50d, and the simple post to SNS display area 50e, the controller 10 determines that the editing start operation of the display item has been detected.

When it is determined that the editing start operation of the display item has been detected (Yes at Step S1003), the controller 10 performs display item editing processing (Step S1004).

Subsequently, the controller 10 determines whether an editing end operation has been detected (Step S1005). For example, when detecting an operation performed on the area indicated as "Edit of Display Item: Complete" in the editing screen 60, the controller 10 determines that the editing end operation has been detected.

When it is determined that the editing end operation has not been detected (No at Step S1005), the controller 10 returns to the processing procedure at Step S1003.

Meanwhile, when it is determined that the editing end operation has been detected (Yes at Step S1005), the controller 10 displays the notification screen 50 on the display 2 (Step S1006), and ends the processing procedure in FIG. 16.

At Step S1003, when it is determined that the editing start operation of the display item has not been detected (No at Step S1003), the controller 10 determines whether an individual editing start operation of the display item has been detected (Step S1007). For example, when any one of the Edit button 60a for individually editing the settings button display area 50b, the Edit button 60b for individually editing the app shortcut display area 50d, or the Edit button 60c for individually editing the simple post to SNS display area 50e is operated, the controller 10 determines that the individual editing start operation of the display item has been detected.

When it is determined that the individual editing start operation of the display item has been detected (Yes at Step S1007), the controller 10 performs the display-item individual editing processing (Step S1008).

Meanwhile, when it is determined that the individual editing start operation of the display item has not been detected (No at Step S1007), the controller 10 shifts to the processing procedure at Step S1005.

Figure 17:
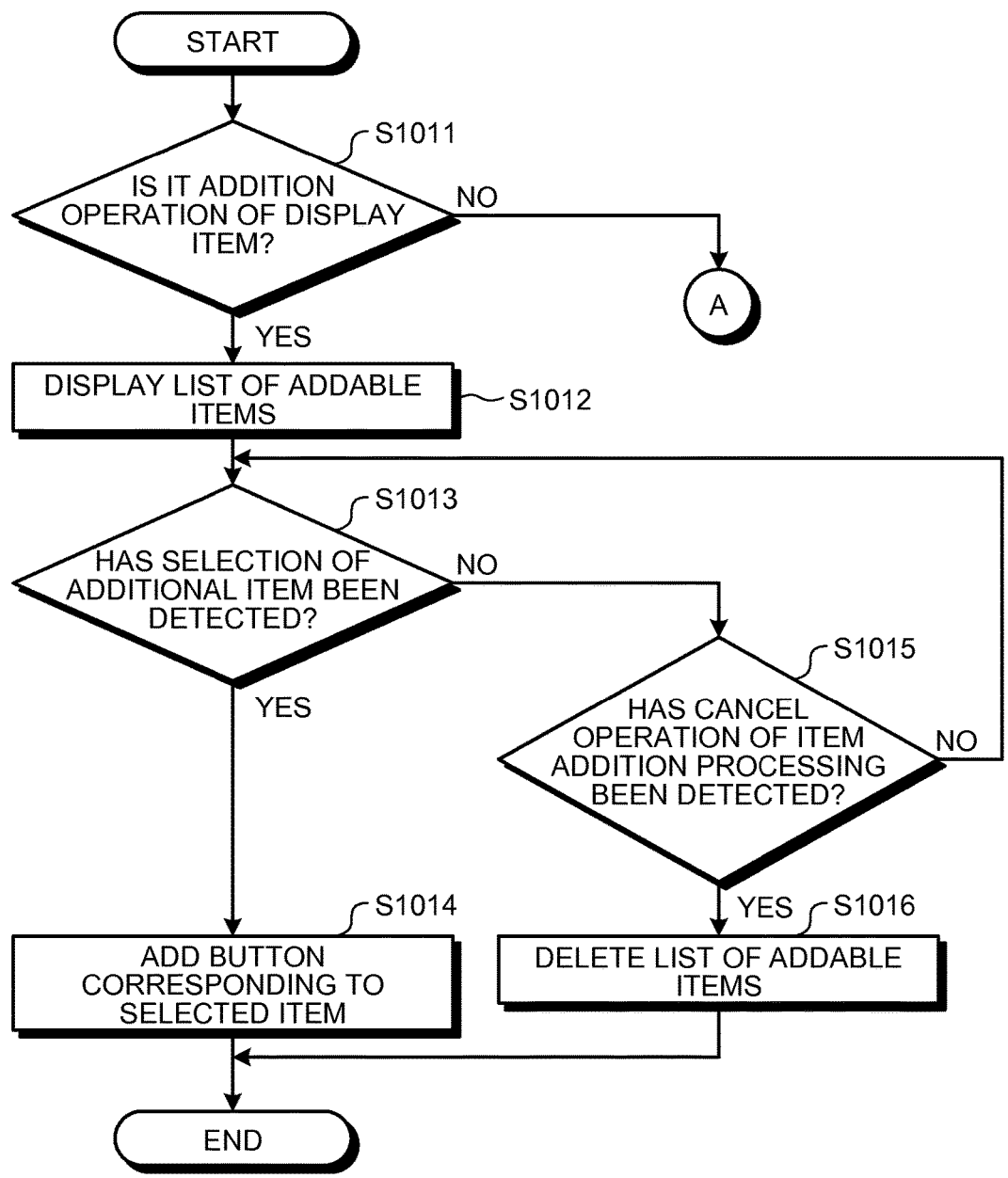
FIG. 17 is a flowchart of a processing procedure of display item editing processing.
Figure 18:
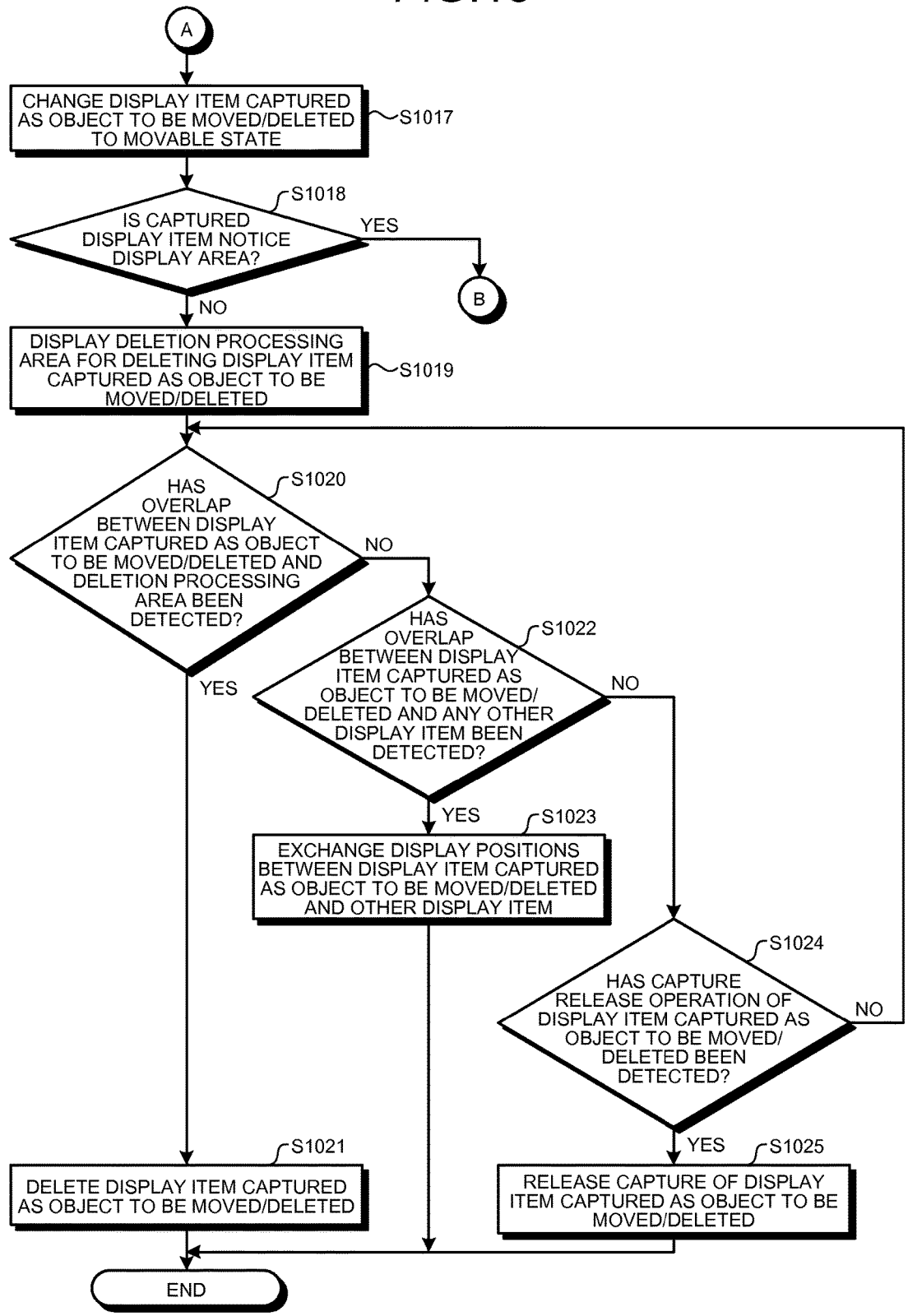
FIG. 18 is a flowchart of a processing procedure of the display item editing processing.
Figure 19:
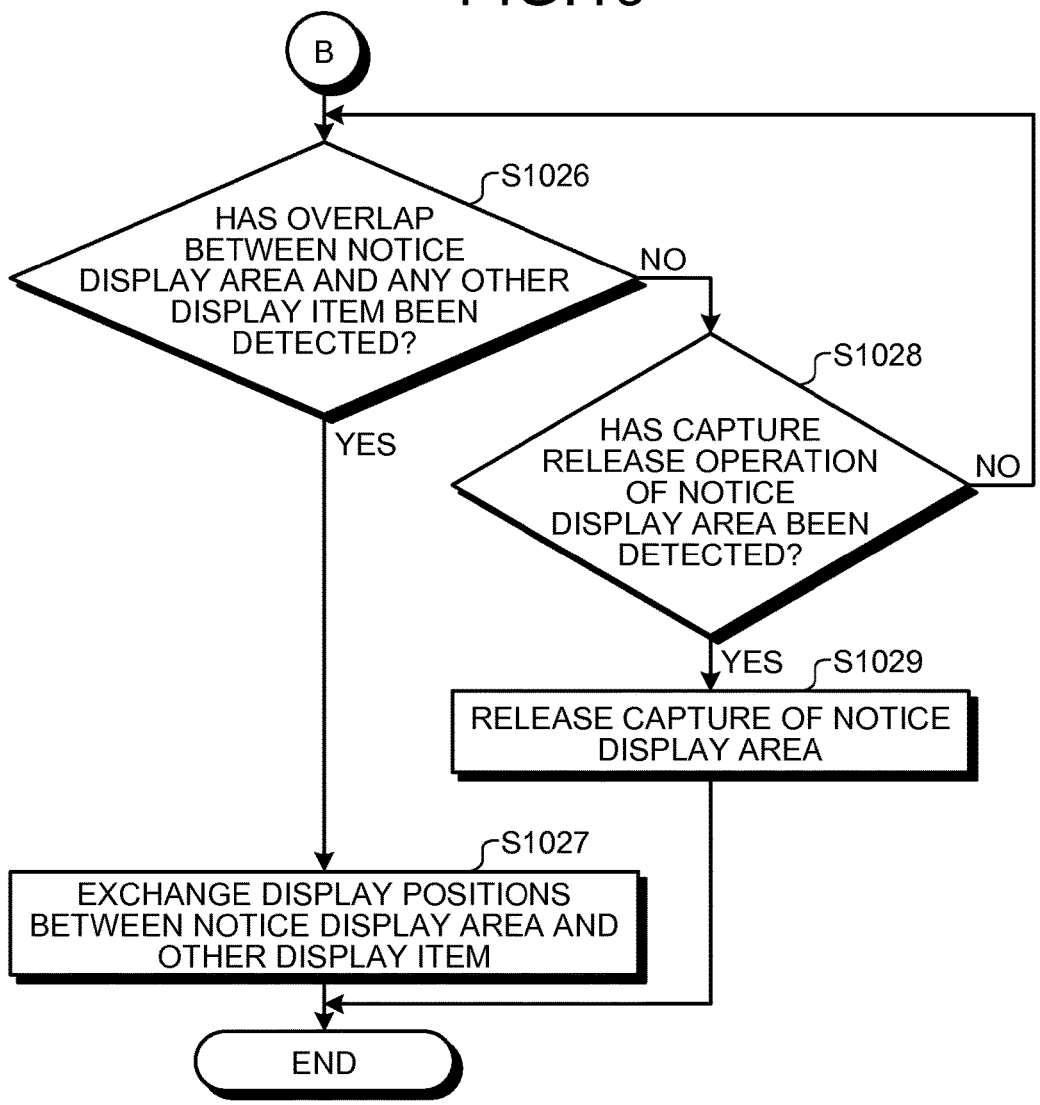
FIG. 19 is a flowchart of a processing procedure of the display item editing processing.

FIG. 17 to FIG. 19 are flowcharts of processing procedures of display item editing processing. The processing flows illustrated in FIG. 17 to FIG. 19 respectively correspond to, for example, the controls illustrated in FIG. 8, FIG. 11, and FIG. 12.

As illustrated in FIG. 17, the controller 10 determines whether the operation detected at Step S1003 in FIG. 16 is an operation to add a display item (Step S1011). For example, when the operation detected at Step S1003 in FIG. 16 is an operation performed on the display item Add button 60d, the controller 10 determines that it is the operation to add a display item.

When it is determined that the operation is the operation to add a display item (Yes at Step S1011), the controller 10 displays a list of addable items (Step S1012).

Subsequently, the controller 10 determines whether a selection of an additional item from the list of addable items has been detected (Step S1013).

When it is determined that a selection of an additional item has been detected (Yes at Step S1013), the controller 10 adds a button corresponding to the selected item to the editing screen 60 (Step S1014), and ends the processing procedure illustrated in FIG. 17.

Meanwhile, when it is determined that a selection of an additional item has not been detected (No at Step S1013), the controller 10 determines whether a cancel operation of item addition processing has been detected (Step S1015). For example, when detecting an operation performed on the area indicated as "Edit of Display Item: Complete" in the editing screen 60, the controller 10 determines that the cancel operation of the item addition processing has been detected. The operation performed on the area indicated as "Edit of Display Item: Complete" may be any operation such as double tap and long touch.

When it is determined that the cancel operation of the item addition processing has been detected (Yes at Step S1015), the controller 10 deletes the list of addable items from the display 2 (Step S1016), and ends the processing procedure illustrated in FIG. 17.

Meanwhile, when it is determined that the cancel operation of the item addition processing has not been detected (No at Step S1015), the controller 10 returns to the processing procedure at Step S1013.

At Step S1011, when the operation detected at Step S1003 in FIG. 16 is not the operation to add a display item (No at Step S1011), the controller 10 determines that the operation is an operation related to movement or deletion of the display item, and shifts to the processing procedure illustrated in FIG. 18.

As illustrated in FIG. 18, the controller 10 changes the display item captured as an object to be moved or deleted to a movable state (Step S1017).

Subsequently, the controller 10 determines whether the captured display item is the notice display area 50c (Step S1018).

When it is determined that the captured display item is not the notice display area 50c (No at Step S1018), the controller 10 displays a deletion processing area for deleting the display item captured as an object to be moved or deleted on the editing screen 60 (Step S1019). The deletion processing area corresponds to, for example, the area indicated as "Edit of Display Item: Delete" in the editing screen 60 (see FIG. 12).

Subsequently, the controller 10 determines whether an overlap between the display item captured as the object to be moved or deleted and the deletion processing area has been detected (Step S1020).

when it is determined that an overlap between the display item captured as the object to be moved or deleted and the deletion processing area has been detected (Yes at Step S1020), the controller 10 deletes the display item captured as the object to be moved or deleted (Step S1021), and ends the processing procedure illustrated in FIG. 18.

Meanwhile, when it is determined that an overlap between the display item captured as the object to be moved or deleted and the deletion processing area has not been detected (No at Step S1020), the controller 10 determines whether an overlap between the display item captured as the object to be moved or deleted and another display item has been detected (Step S1022).

When it is determined that an overlap between the display item captured as the object to be moved or deleted and another display item has been detected (Yes at Step S1022), the controller 10 exchanges the display positions between the display item captured as the object to be moved or deleted and another display item (Step S1023), and ends the processing procedure illustrated in FIG. 18.

Meanwhile, when it is determined that an overlap between the display item captured as the object to be moved or deleted and another display item has not been detected (No at Step S1022), the controller 10 determines whether a capture release operation of the display item captured as the object to be moved or deleted has been detected (Step S1024). For example, when detecting an operation performed on the area indicated as "Edit of Display Item: Complete" in the editing screen 60, the controller 10 determines that the capture release operation of the display item has been detected. The operation performed on the area indicated as "Edit of Display Item: Complete" may be any operation such as double tap and long touch.

When it is determined that the capture release operation of the display item captured as the object to be moved or deleted has been detected (Yes at Step S1024), the controller 10 releases the capture of the display item captured as the object to be moved or deleted (Step S1025), and ends the processing procedure illustrated in FIG. 18.

Meanwhile, when it is determined that the capture release operation of the display item captured as the object to be moved or deleted has not been detected (No at Step S1024), the controller 10 returns to the processing procedure at Step S1020.

At Step S1018, when it is determined that the captured display item is the notice display area 50c (Yes at Step S1018), the controller 10 determines that the operation is an operation related to change of the display position of the notice display area 50c, and shifts to the processing procedure illustrated in FIG. 19. In Embodiment 1, the deletion of the notice display area 50c is not allowed. Therefore, even if the overlap between the notice display area 50c and the deletion processing area is detected, the controller 10 does not delete the notice display area 50c. On the other hand, in Embodiment 1, the movement of the notice display area 50c is possible, and the display position of the notice display area 50c can be changed as explained below.

As illustrated in FIG. 19, the controller 10 determined whether an overlap between the notice display area 50c and another display item has been detected (Step S1026).

When it is determined that an overlap between the notice display area 50c and another display item has been detected (Yes at Step S1026), the controller 10 exchanges the display positions between the notice display area 50c and another display item (Step S1027), and ends the processing procedure illustrated in FIG. 19.

Meanwhile, when it is determined that an overlap between the notice display area 50c and another display item has not been detected (No at Step S1026), the controller 10 determines whether a capture release operation of the notice display area 50c has been detected (Step S1028). For example, when detecting an operation performed on the area indicated as "Edit of Display Item: Complete" in the editing screen 60, the controller 10 determines that the capture release operation of the notice display area 50c has been detected. The operation performed on the area indicated as "Edit of Display Item: Complete" may be any operation such as double tap and long touch.

When it is determined that the capture release operation of the notice display area 50c has been detected (Yes at Step S1028), the controller 10 releases the capture of the notice display area 50c (Step S1029), and ends the processing procedure illustrated in FIG. 19.

Meanwhile, when it is determined that the capture release operation of the notice display area 50c has not been detected (No at Step S1028), the controller 10 returns to the processing procedure at Step S1026.

In the processing procedure illustrated in FIG. 19, the example of changing the display position of the notice display area 50c is explained; however, it may be configured that the display position of the notice display area 50c cannot be changed.

Figure 20:
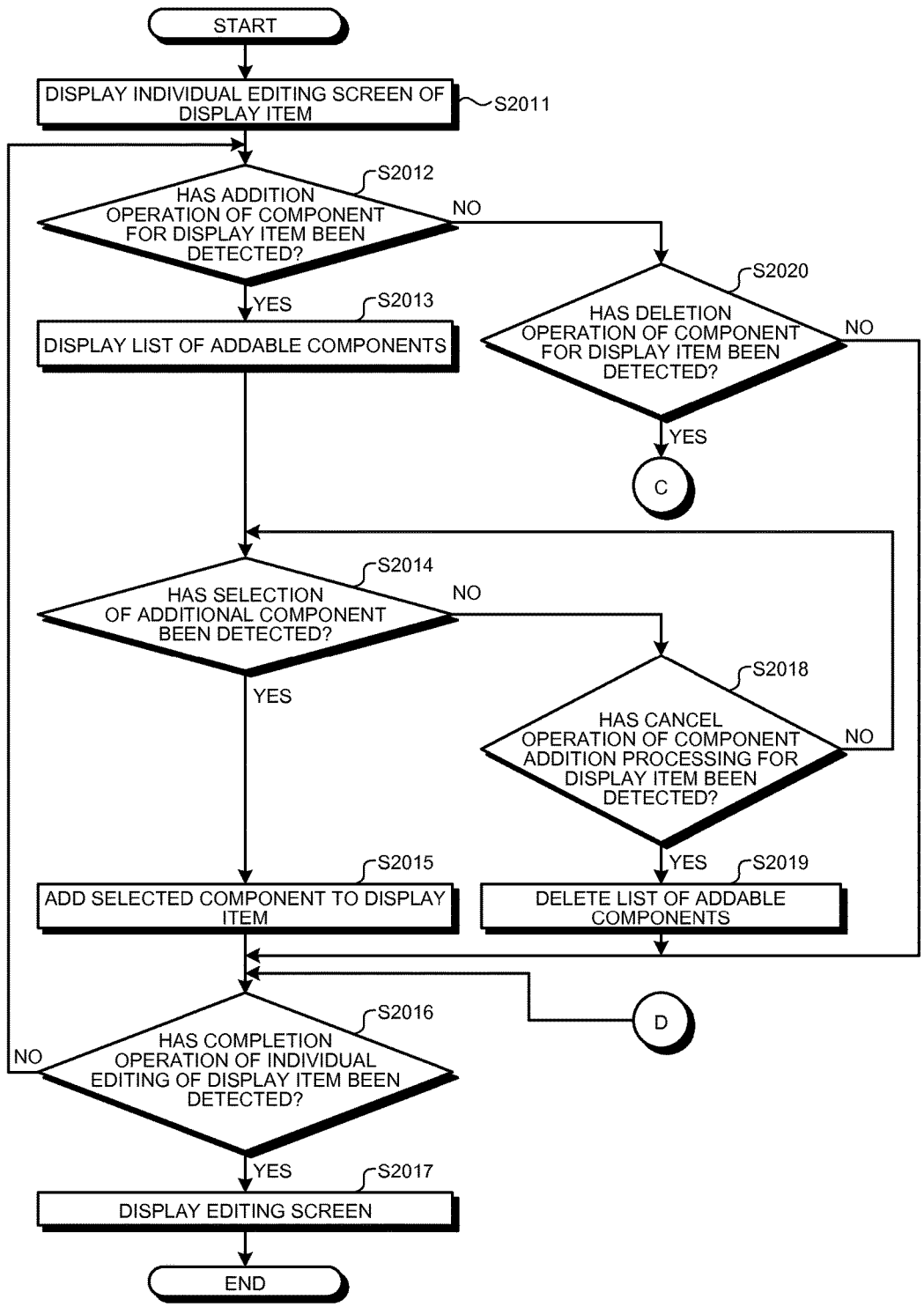
FIG. 20 is a flowchart of a processing procedure of display-item individual editing processing.
Figure 21:
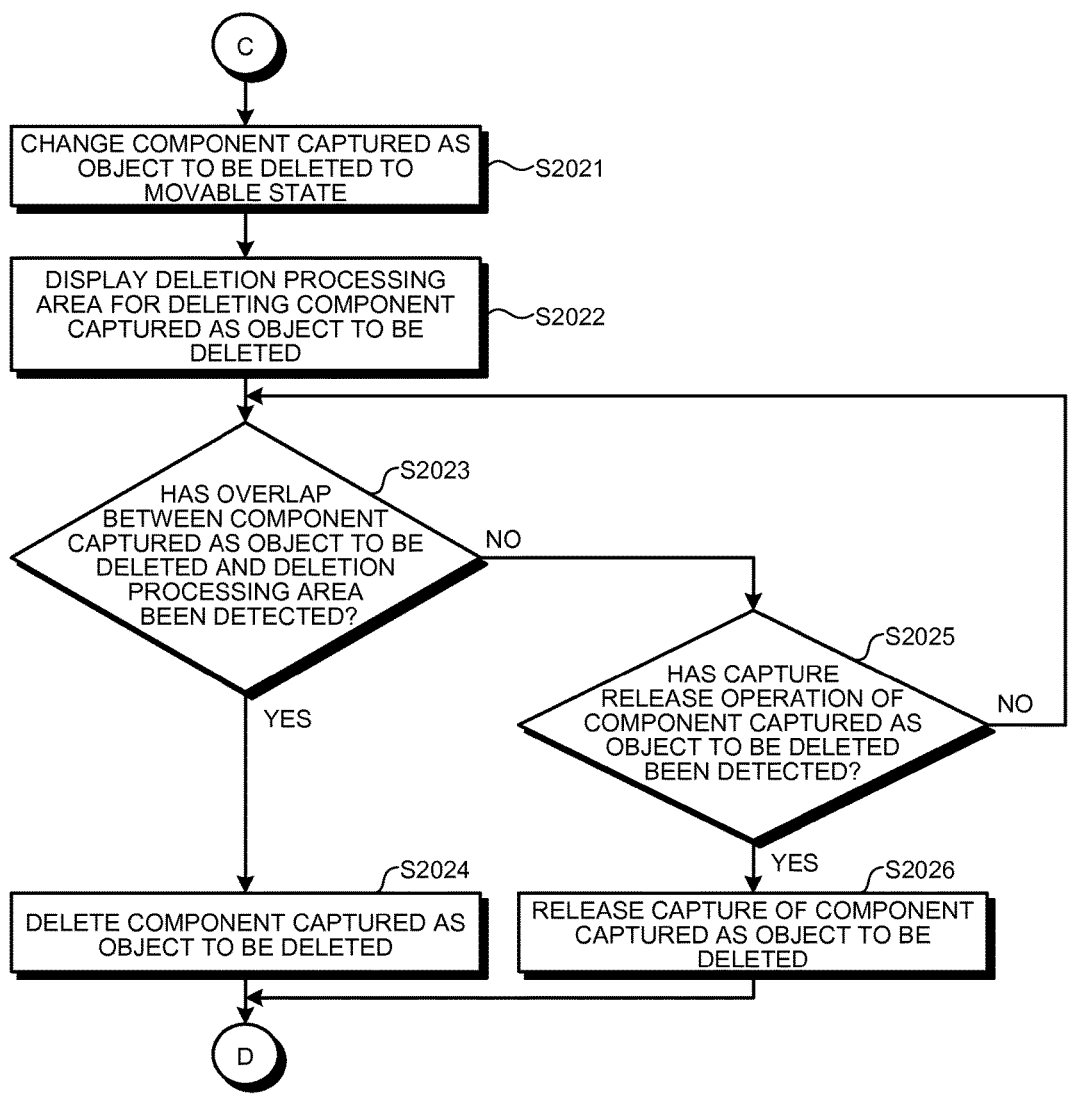
FIG. 21 is a flowchart of a processing procedure of the display-item individual editing processing.

FIG. 20 and FIG. 21 are flowcharts of display-item individual editing processing. The processing flows illustrated in FIG. 20 and FIG. 21 correspond to the controls or the like illustrated in, for example, FIG. 13 to FIG. 15.

As illustrated in FIG. 20, the controller 10 displays the individual editing screen of the display item in which the individual editing start processing of the display item illustrated at Step S1007 in FIG. 16 is detected (Step S2011).

Subsequently, the controller 10 determines whether an operation to add a component for the display item has been detected (Step S2012). For example, when there is an operation performed on the Add button provided in the individual editing screen, the controller 10 determines that the operation to add a component for the display item has been detected. The component corresponds to a button in the settings button display area 50b or an icon in the app shortcut display area 50d, or the like.

When it is determined that the operation to add a component for the display item has been detected (Yes at Step S2012), the controller 10 displays a list of addable components (Step S2013).

Subsequently, the controller 10 determines whether a selection of an additional component from the list of addable components has been detected (Step S2014).

When it is determined that a selection of an additional component has been detected (Yes at Step S2014), the controller 10 adds the selected component to the display item as an object to be individually edited (Step S2015).

Then, the controller 10 determines whether a completion operation of individual editing of the display item has been detected (Step S2016). For example, when detecting an operation performed on the area indicated as "Edit of Settings Button: Complete" in the individual editing screen, the controller 10 determines that the completion operation of the individual editing of the display item has been detected.

When it is determined that the completion operation of the individual editing of the display item has been detected (Yes at Step S2016), the controller 10 displays the editing screen 60 on the display 2 (Step S2017), and ends the processing procedure illustrated in FIG. 20.

Meanwhile, when it is determined that the completion operation of the individual editing of the display item has not been detected (No at Step S2016), the controller 10 returns to the processing procedure at Step S2012.

At Step S2014, when it is determined that the selection of the additional component has not been detected (No at Step S2014), the controller 10 determines whether the cancel operation of component addition processing for the display item has been detected (Step S2018). For example, when detecting an operation performed on the area indicated as "Edit of Settings Button: Complete" in the individual editing screen, the controller 10 determines that the cancel operation of component addition processing for the display item has been detected.

When it is determined that the cancel operation of component addition processing for the display item has been detected (Yes at Step S2018), the controller 10 deletes the list of addable components from the display 2 (Step S2019), and shifts to the processing procedure at Step S2016. On the other hand, when it is determined that the cancel operation of component addition processing for the display item has not been detected (No at Step S2018), the controller 10 returns to the processing procedure at Step S2014.

At Step S2012, when it is determined that the operation to add a component for the display item has not been detected (No at Step S2012), the controller 10 determines whether an operation to delete a component for the display item has been detected (Step S2020). For example, when detecting an operation performed on the component included in the display item as an object to be individually edited, the controller 10 determines that the operation to delete the component for the display item has been detected.

When it is determined that the operation to delete the component for the display item has not been detected (No at Step S2020), the controller 10 shifts to the processing procedure at Step S2016. On the other hand, when it is determined that the operation to delete the component for the display item has been detected (Yes at Step S2020), the controller 10 shifts to the processing procedure illustrated in FIG. 21.

As illustrated in FIG. 21, the controller 10 changes the component captured as an object to be deleted to a movable state (Step S2021).

Subsequently, the controller 10 displays a deletion processing area for deleting the component captured as an object to be deleted on an individual editing screen (Step S2022). The deletion processing area corresponds to, for example, the area indicated as "Edit of Settings Button: Delete" in the individual editing screen 71 (see FIG. 15).

Then, the controller 10 determines whether an overlap between the component captured as the object to be deleted and the deletion processing area has been detected (Step S2023).

When it is determined that an overlap between the component captured as the object to be deleted and the deletion processing area has been detected (Yes at Step S2023), the controller 10 deletes the component captured as the object to be deleted (Step S2024), and returns to the processing procedure at Step S2016 illustrated in FIG. 20.

Meanwhile, when it is determined that an overlap between the component captured as the object to be deleted and the deletion processing area has not been detected (No at Step S2023), the controller 10 determines whether a capture release operation of the component captured as the object to be deleted has been detected (Step S2025). For example, when an operation performed on the area indicated as "Edit of Settings Button: Delete" in the individual editing screen 71, the controller 10 determines that the capture release operation of the component captured as the object to be deleted has been detected.

When it is determined that the capture release operation of the component captured as the object to be deleted has been detected (Yes at Step S2025), the controller 10 releases the capture of the component captured as the object to be deleted (Step S2026), and returns to the processing procedure at Step S2016 illustrated in FIG. 20. On the other hand, when it is determined that the capture release operation of the component captured as the object to be deleted has not been detected (No at Step S2025), the controller 10 returns to the processing procedure at Step S2023.

As explained above, in Embodiment 1, when detecting an operation performed on the Edit button 50f provided in the notification screen 50 displayed on the display 2, the smartphone 1 shifts the notification screen 50 to the editing screen 60 for editing the notification screen 50 (see FIG. 7). Therefore, according to the embodiment, the notification screen 50 can be edited, which enables the notification screen 50 to be effectively used.

In the embodiment, the smartphone 1 adds a display item in the notification screen, or the smartphone 1 deletes a display item in the notification screen. Alternatively, the smartphone 1 changes the display position of a display item on the notification screen. Therefore, according to Embodiment 1, the user can customize the configuration of the notification screen.

In Embodiment 1, the smartphone 1 adds a component in the display item, or the smartphone 1 deletes a component in the display item. Alternatively, the smartphone 1 changes the display position of a component in the display item. Therefore, according to Embodiment 1, the user can customize the notification screen by the display item.

Although the art of appended claims has been described with respect to specific Embodiment 1 for a complete and clear disclosure, the appended claims are not to be thus limited but are to be construed as embodying all modifications and alternative constructions that may occur to one skilled in the art which fairly fall within the basic teaching herein set forth.

For example, each of the programs illustrated in FIG. 1 may be divided into a plurality of modules. Alternatively, each of the programs illustrated in FIG. 1 may be integrated with other program.

In the embodiment, the smartphone has been explained as one of examples of the electronic device; however, the device according to the appended claims is not limited to the smartphone. The device according to the appended claims may be any mobile electronic device other than the smartphone. The mobile electronic device is, for example, a mobile phone, a tablet, a mobile personal computer, a digital camera, a media player, an electronic book reader, a navigator, and a gaming device. Alternatively, the electronic device according to the appended claims may be a stationary-type electronic device. The stationary-type electronic device is, for example, a desktop personal computer and a television receiver.

Embodiment 2

Figure 22:
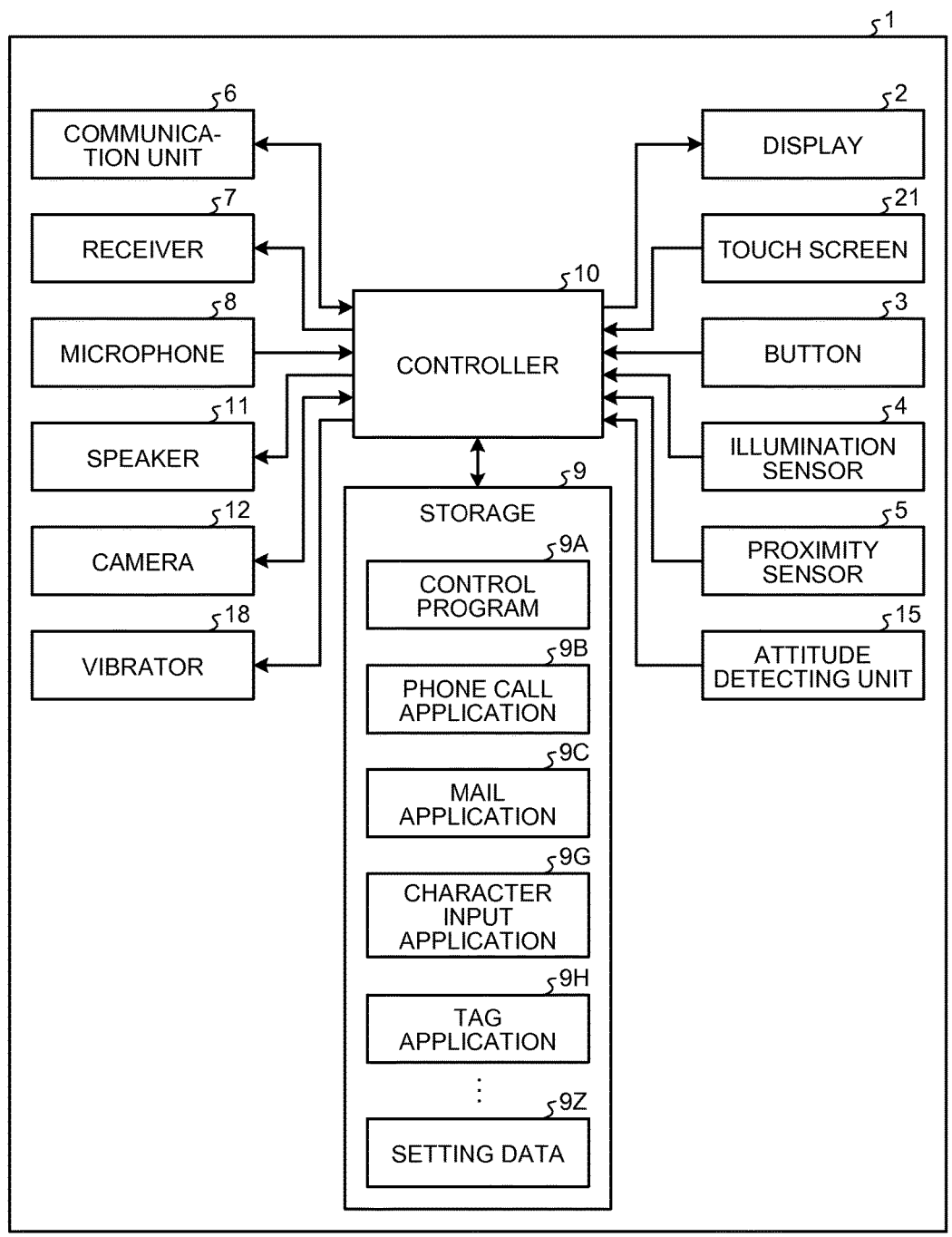
FIG. 22 is a block diagram of a smartphone according to Embodiment 2.

A functional configuration of a smartphone 1 according to Embodiment 2 will be explained with reference to FIG. 22. FIG. 22 is the block diagram of the smartphone according to Embodiment 2. In the following explanation, same reference signs may be assigned to similar components. Moreover, the overlapping explanation may not be repeated.

As illustrated in FIG. 22, the smartphone 1 includes the display 2, the button 3, the illumination sensor 4, the proximity sensor 5, the communication unit 6, the receiver 7, the microphone 8, the storage 9, the controller 10, the speaker 11, the camera 12, the attitude detecting unit 15, the vibrator 18, and the touch screen 21.

The display 2 includes a display device such as an LCD (Liquid Crystal Display), an GELD (Organic Electro-Luminescence Display), or an IELD (Inorganic Electro-Luminescence Display). The display 2 displays text, images, symbols, graphics, and the like.

The button 3 receives an operation input from the user. The number of buttons 3 may be single or plural.

The illumination sensor 4 detects illumination of the ambient light of the smartphone 1. The illumination indicates intensity, lightness, or brightness of light. The illumination sensor 4 is used, for example, to adjust the brightness of the display 2.

The proximity sensor 5 detects the presence of nearby objects without any physical contact. The proximity sensor 5 detects the presence of the objects based on a change in a magnetic field or a change in a return time of a reflected wave of an ultrasonic wave, etc. The proximity sensor 5 detects that, for example, the display 2 is brought close to someone's face. The illumination sensor 4 and the proximity sensor 5 may be configured as one sensor. The illumination sensor 4 may be used as the proximity sensor 5.

The communication unit 6 performs communication via a wireless system. A wireless communication standard supported by the communication unit 6 includes, for example, a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication unit 6 may support one or more of the communication standards.

The communication unit 6 receives a radio signal of a predetermined frequency band from a GPS satellite, performs demodulation processing on the received radio signal, and transmits the signal subjected to the processing to the controller 10. The smartphone 1 may provide a discrete communication unit independent from the communication unit 6 by separating the function of communication with the GPS satellite from the communication unit 6.

The receiver 7 is a sound output unit. The receiver 7 outputs a sound signal transmitted from the controller 10 as a sound. The receiver 7 is used, for example, to output a voice of the other party during a call. The microphone 8 is a sound input unit. The microphone 8 converts the voice of the user or the like to a sound signal and transmits the sound signal to the controller 10.

The storage 9 stores programs and data. The storage 9 is used also as a work area for temporarily storing a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

Programs stored in the storage 9 include applications executed in the foreground or the background and a control program for assisting operations of the applications. The application executed in the foreground displays, for example, a screen on the display 2. The control program includes, for example, an OS. The application and the control program may be installed in the storage 9 through wireless communication by the communication unit 6 or through a non-transitory storage medium.

The storage 9 stores, for example, the control program 9A, the phone call application 9B, the mail application 9C, a character input application 9G, a tag application 9H, and the setting data 9Z.

The control program 9A provides the function related to the various controls for operating the smartphone 1. The control program 9A provides the function for displaying, for example, the notification screen including the notification area for notifying the user of information on the display. The notification screen includes the notice display area being the notification area for notifying the user of detailed information for information to be notified to the so-called status bar about an application executed in the background.

Moreover, the control program 9A provides a function for displaying a creation text created through an operating unit on the notification screen. The operating unit corresponds to the button 3 or the touch screen 21, etc. The control program 9A further provides a function for displaying a creation screen for accepting a creation operation of the creation text on the display 2. Moreover, the control program 9A provides a function for displaying the editing screen for accepting deletion or update of the creation text on the display 2.

Additionally, the control program 9A provides the function for implementing communication, by controlling the communication unit 6 and the like, using LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System), etc.

The control program 9A provides the function for implementing short-distance wireless communication, by controlling the communication unit 6 or the like, using IEEE 802.11, Bluetooth (registered trademark), IrDA (Infrared Data Association), NFC (Near Field Communication), and WPAN (Wireless Personal Area Network), etc.

The control program 9A provides a function for making a phone call by controlling, for example, the communication unit 6 and the microphone 8.

The function provided by the control program 9A may be used in combination with a function provided by other program stored in the storage 9, such as the phone call application 9B or the mail application 9C. The function provided by the control program 9A may be divided into a plurality of program modules or may be combined with other program.

The phone call application 9B provides the phone call function for phone calls through wireless communication. The mail application 9C provides the electronic mail function for composition, transmission, reception, display, and the like of electronic mails. The character input application 9G provides a function for easily activating, for example, a text editor from an idle state to perform character input. The idle state includes a state in which the lock screen, a screen on which a list of the icons corresponding to the applications is displayed, or the like, is displayed on the display 2. The tag application 9H provides a function for forming the creation screen for accepting creation of text and the editing screen for accepting deletion or update of text. The applications stored in the storage 9 are exemplarily illustrated. In addition to the applications illustrated in FIG. 22, a browser application, a navigate application, a music player application, a moving image reproduction application, a calculator application, a memo pad application, and the like may be stored therein.

The setting data 9Z includes information on various settings and processing related to the operations of the smartphone 1.

The controller 10 is a processing unit. Examples of the processing unit include, but are not limited to, a CPU (Central Processing Unit), an SoC (System-on-a-chip), an MCU (Micro Control Unit), and an FPGA (Field-Programmable Gate Array). The controller 10 integrally controls the operations of the smartphone 1 to implement the various functions.

Specifically, the controller 10 executes instructions included in a program stored in the storage 9 while referring to data stored in the storage 9 as necessary. The controller 10 then controls function units according to the data and the instructions to thereby implement the various functions. Examples of the function units include, but are not limited to, the display 2, the communication unit 6, the microphone 8, and the speaker 11. The controller 10 can change the control according to a detection result of a detector. Examples of the detector include, but are not limited to, the button 3, the illumination sensor 4, the proximity sensor 5, the microphone 8, the camera 12, the attitude detecting unit 15, and the touch screen 21.

The controller 10 executes the control program 9A to thereby implement the processing for displaying the notification screen including the notification area for notifying the user of information on the display 2. Specifically, for example, when detecting a touch gesture made by the user, the controller 10 displays the notification screen on the display 2. Even if any screen is displayed on the display 2, the controller 10 can invoke and display the notification screen on the display 2. The controller 10 can invoke and display the notification screen on the display 2 in response to the detection of the touch gesture made by the user when, for example, the so-called home screen is displayed on the display 2. Moreover, the controller 10 can invoke and display the notification screen on the display 2 in response to the detection of the touch gesture made by the user when, for example, the application screen corresponding to the mail application, the browser application, or the map and the scheduler is displayed on the display 2. Furthermore, the controller 10 can invoke and display the notification screen on the display 2 even if the so-called lock screen displayed when the smartphone 1 is in a locked state is displayed on the display 2. The notification screen can be invoked and displayed on the display 2. The locked state may include not only a state not accepting a user operation but also a security locked state. The notification screen includes the notice display area being the notification area for notifying the user of detailed information for information to be notified to the so-called status bar about an application executed in the background.

Moreover, the controller 10 executes the control program 9A to thereby implement processing for displaying a creation text created through an operating unit on the notification screen. The operating unit corresponds to the button 3 or the touch screen 21, etc. This enables the smartphone 1 to display the notification screen including the creation text on the display 2 even if the so-called home screen, the application screen, or the so-called lock screen is displayed on the display 2. Furthermore, the controller 10 executes the control program 9A to thereby implement processing for displaying the creation screen for accepting a creation operation of the creation text on the display 2. The controller 10 executes the control program 9A to thereby implement processing for displaying the editing screen for accepting deletion or update of the creation text on the display 2.

The speaker 11 is a sound output unit. The speaker 11 outputs a sound signal transmitted from the controller 10 as a sound. The speaker 11 is used to output, for example, a ring tone and music. Either one of the receiver 7 and the speaker 11 may have the other function.

The camera 12 converts a photographed image to an electric signal. The camera 12 includes, for example, an in-camera for photographing an object facing the display 2 and an out-camera for photographing an object facing the opposite side of the display 2.

The attitude detecting unit 15 detects an attitude of the smartphone 1. The attitude detecting unit 15 includes at least one of an acceleration sensor, a direction sensor, and a gyroscope in order to detect its attitude.

The vibrator 18 vibrates part or whole of the smartphone 1. The vibrator 18 includes, for example, a piezoelectric element or an eccentric motor in order to generate vibration.

The vibration generated by the vibrator 18 is used to inform the user of various events such as incoming calls.

The touch screen 21 detects a touch on the touch screen 21. The controller 10 (smartphone 1) detects various operations (gestures) performed on the touch screen 21 using a finger, a stylus, a pen, or the like (hereinafter, simply called "finger") based on the touch detected through the touch screen 21. For example, the touch screen 21 includes a touch sensor. The touch sensor detects a touch of the finger on the touch screen 21 together with a position of the touched location on the touch screen 21, and notifies the controller 10 of the detection. Examples of the various operations (gestures) detected by the controller 10 through the touch screen 21 include, but are not limited to, touch, long touch, release, swipe, tap, double tap, long tap, drag, flick, pinch in, and pinch out. The detection method of the touch screen 21 may be any detection method such as capacitive type detection method, a resistive type detection method, a surface acoustic wave type (or ultrasonic type) detection method, an infrared type detection method, an electromagnetic induction type detection method, a load sensing type detection method, etc. As illustrated in FIG. 1, the display 2 and the touch screen 21 are functionally separated from each other, but may be integrated physically as a touch screen display.

The functional configuration of the smartphone 1 illustrated in FIG. 22 is exemplarily described and may be modified as required within a scope that does not depart from the gist of the present invention.

One of examples of control by the smartphone 1 of when a text is displayed on the notification screen will be explained with reference to FIG. 23 to FIG. 26. Sign F1 appearing in FIG. 23 to FIG. 26 indicates a user's finger.

In the description herein below, an operation simply indicated as "operation" may be any operation as an object to be detected such as touch, tap, swipe, and double tap, unless the association with any other processing overlaps the operation. The following describes examples of control of when the so-called lock screen is displayed on the display 2; however, the same control can be implemented even if the so-called home screen or the application screen is displayed on the display 2.

Figure 23:
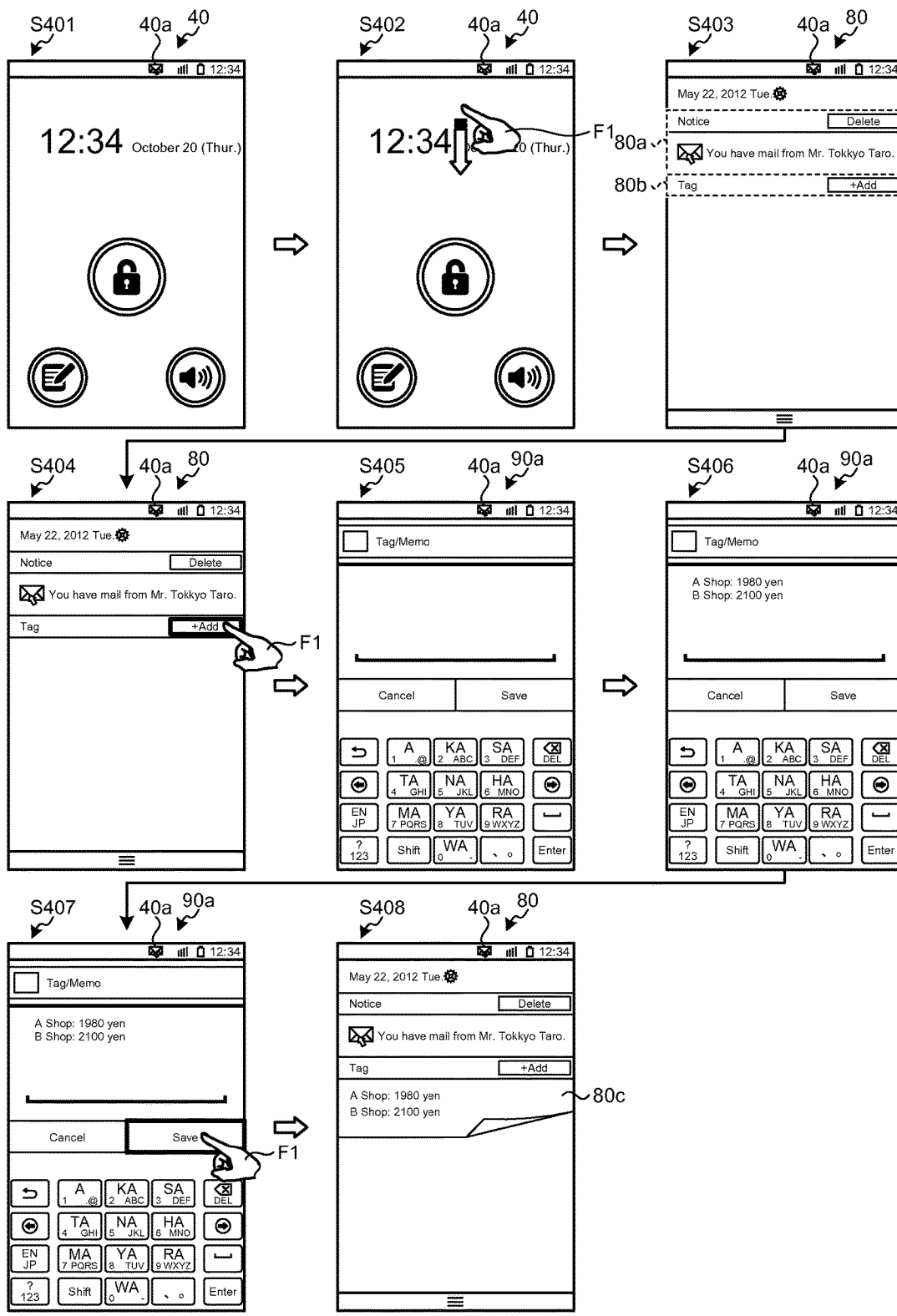
FIG. 23 is a diagram of one of examples of control of when a text is created in the notification screen displayed on the display.

FIG. 23 is a diagram of one of examples of control of when a text is created in the notification screen displayed on the display. As illustrated in FIG. 23, the smartphone 1 displays the lock screen 40 on the display 2 (Step S401). The lock screen 40 is displayed when the smartphone 1 is in the locked state. When the lock screen 40 is displayed on the display 2, the smartphone 1 does not accept a user operation except for a specific operation. The specific operation includes, for example, an operation for unlocking the locked state and an operation for displaying the notification screen on the display 2. The locked state may include not only a state of not accepting a user operation but also a security locked state. In the example illustrated in FIG. 23, the icon 40a for notifying the user of reception of a mail is displayed in the so-called status bar provided above the lock screen 40.

Subsequently, when detecting, through the touch screen 21, an operation from the upper end of the lock screen 40 where the status bar is displayed toward a lower end thereof (Step S402), the smartphone 1 displays a notification screen 80 on the display 2 (Step S403). Provided in the notification screen 80 are a notice display area 80a which is the notification area and an operation bar 80b for displaying a creation screen of a tag.

Then when detecting an operation performed on an Add button (+Add) of a tag in the operation bar 80b through the touch screen 21 (Step S404), the smartphone 1 displays a creation screen 90a of a tag on the display 2 (Step S405). The creation screen 90a includes a display window for displaying input characters, a software keyboard used to perform character input through a user touch operation, a Save button for saving created characters, and a Cancel button for cancelling the creation of a tag, etc.

When detecting, after the input of the characters on the creation screen 90a (Step S406), a tap on the Save button through the touch screen 21 (Step S407), the smartphone 1 displays the notification screen 50, to which a tag 80c including the characters input on the creation screen 90a is attached, on the display 2 (Step S408).

Figure 24:
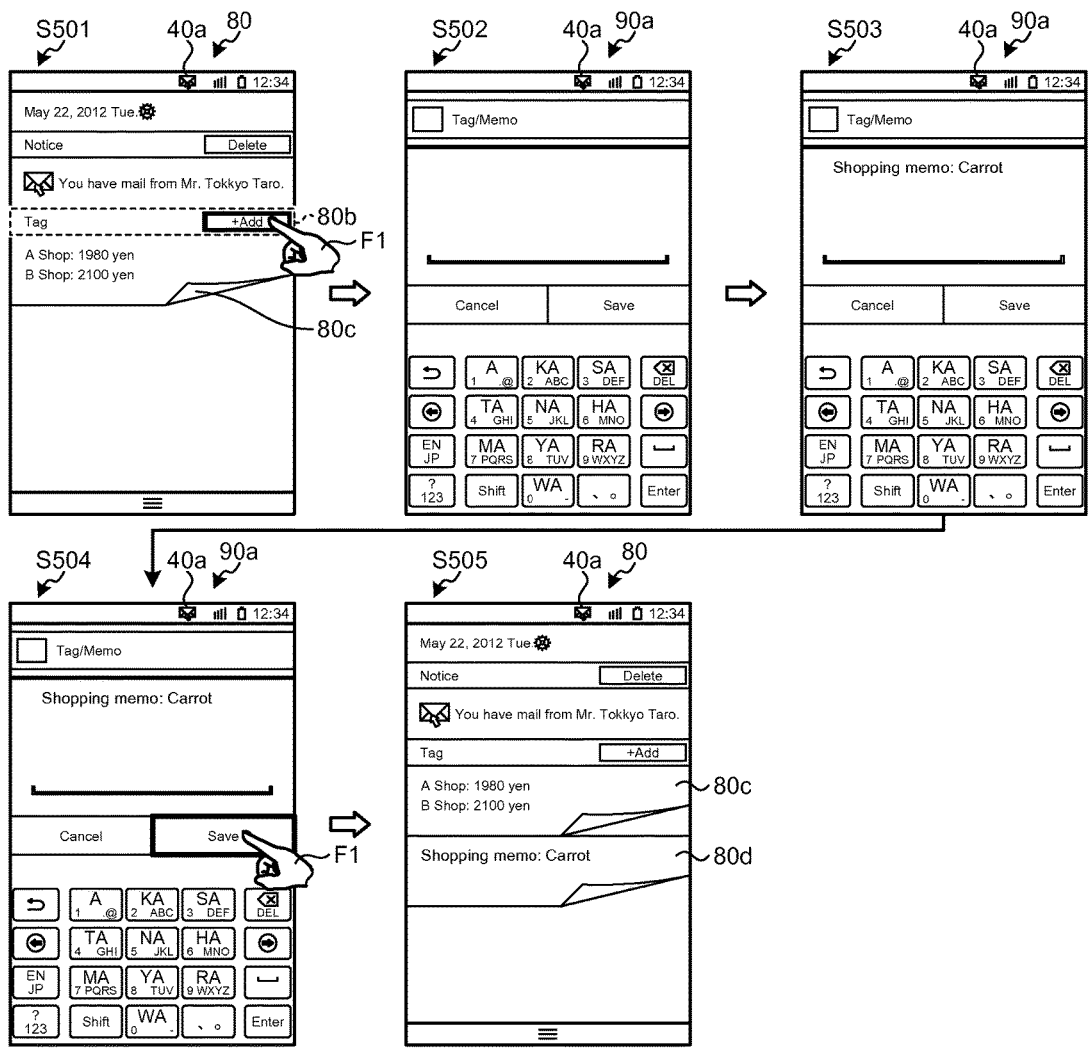
FIG. 24 is a diagram of another example of the control of when a text is created in the notification screen displayed on the display.

FIG. 24 is a diagram of another example of the control of when a text is created in the notification screen displayed on the display 2. FIG. 24 depicts one of examples in which another tag is further created after the tag illustrated in FIG. 23 is created.

As illustrated in FIG. 24, when detecting an operation performed on the Add button (+Add) of the tag in the operation bar 80b through the touch screen 21 while displaying the notification screen 80 to which the tag 80c is attached (Step S501), the smartphone 1 displays the creation screen 90a on the display 2 (Step S502).

When detecting, after the input of the characters on the creation screen 90a (Step S503), an operation performed on the Save button through the touch screen 21 (Step S504), the smartphone 1 displays the notification screen 80, in which a tag 80d including the characters input on the creation screen 90a is attached to an area below the tag 80c, on the display 2 (Step S505).

Figure 25:
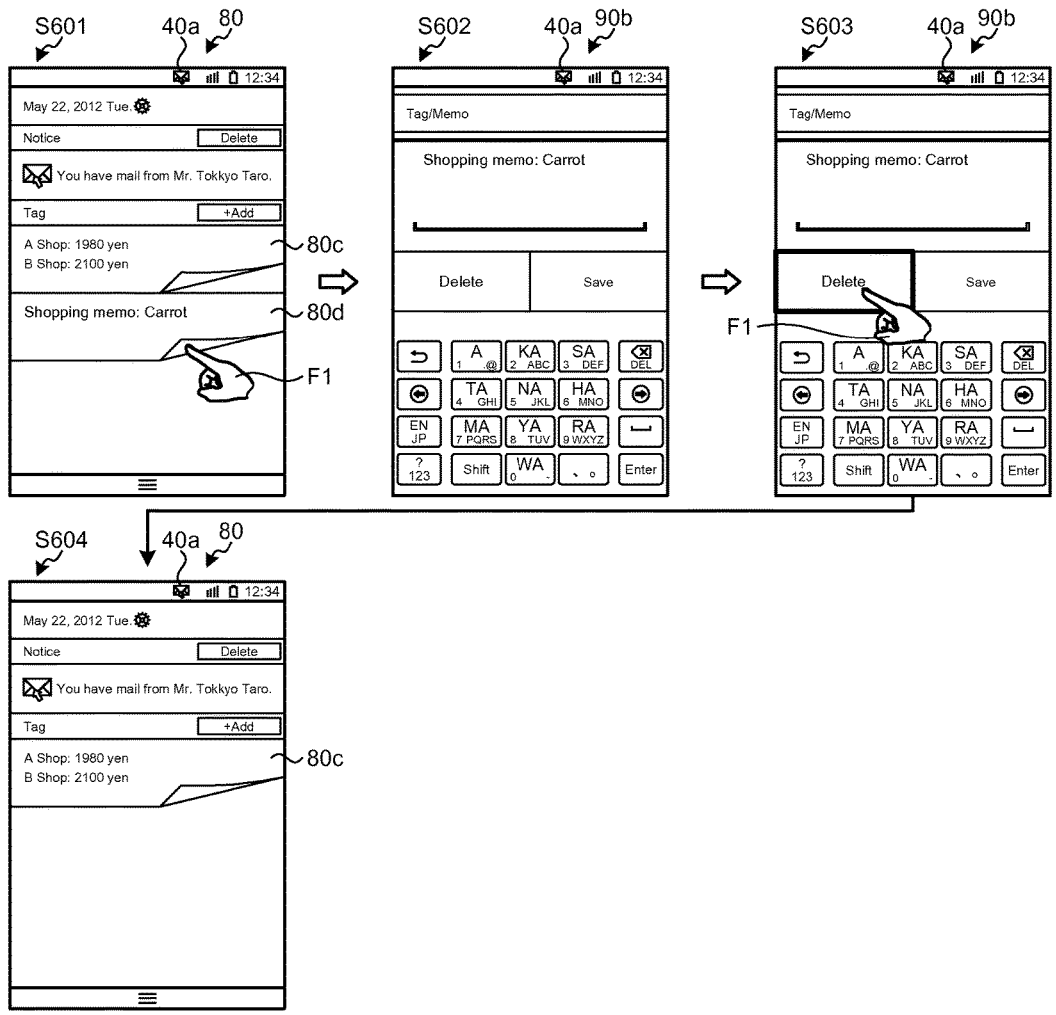
FIG. 25 is a diagram of one of examples of control on how to delete a tag displayed on the notification screen.

FIG. 25 is a diagram of one of examples of control on how to delete the tag displayed on the notification screen. FIG. 25 depicts one of examples of deleting the tag created in FIG. 24 from the notification screen.

As illustrated in FIG. 25, when detecting an operation performed on the tag 80d through the touch screen 21 while displaying the notification screen 80 to which the tag 80c and the tag 80d are attached (Step S601), the smartphone 1 displays an editing screen 90b on the display 2 (Step S602).

Subsequently, when detecting an operation performed on a Delete button through the touch screen 21 (Step S603), the smartphone 1 displays the notification screen 80 from which the tag 80d is deleted on the display 2 (Step S604).

Figure 26:
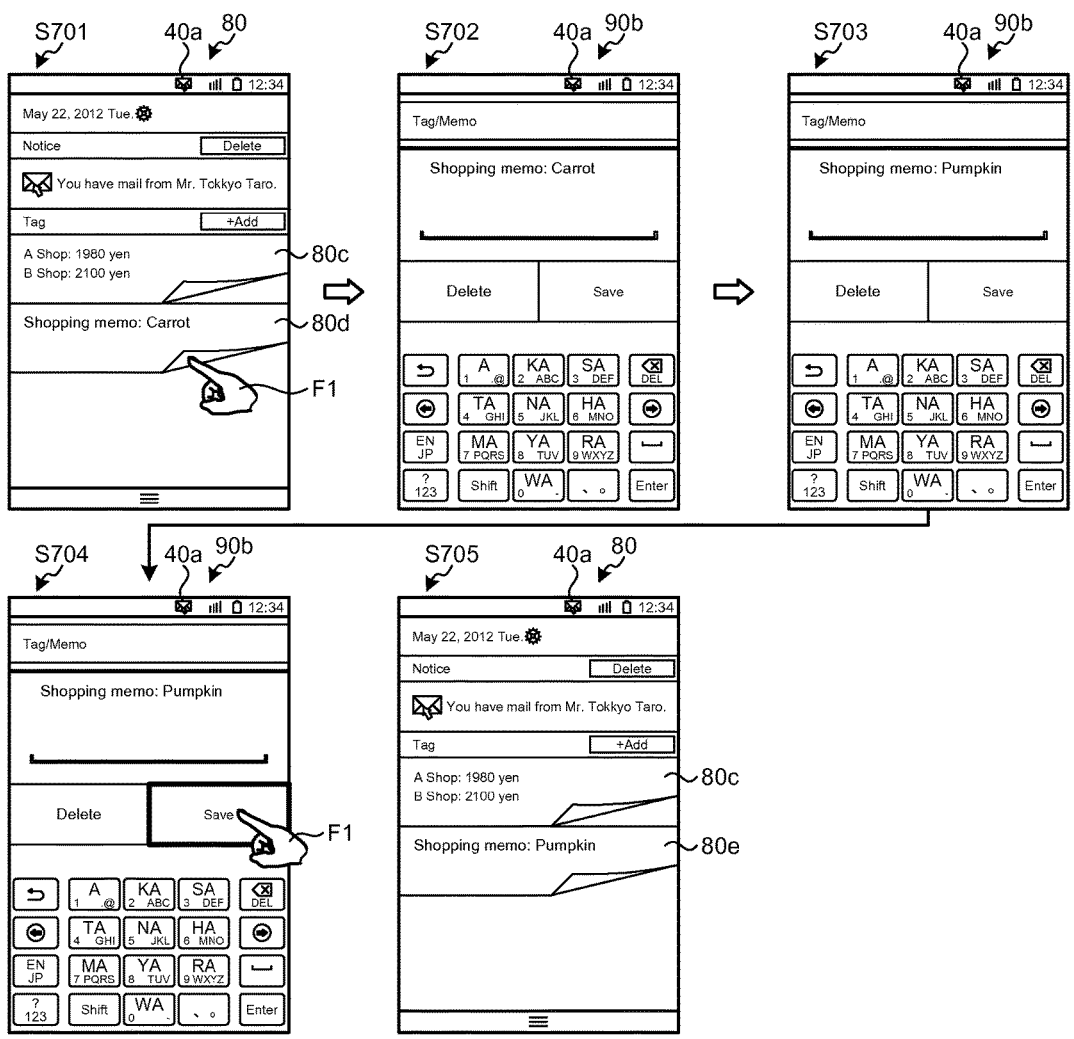
FIG. 26 is a diagram of one of examples of control on how to update the tag displayed on the notification screen.

FIG. 26 is a diagram of one of examples of control on how to update the tag displayed on the notification screen. FIG. 26 depicts one of examples of updating the content of the tag created in FIG. 24.

As illustrated in FIG. 26, when detecting an operation performed on the tag 80d through the touch screen 21 while displaying the notification screen 80 to which the tag 80c and the tag 80d are attached (Step S701), the smartphone 1 displays the editing screen 90b on the display 2 (Step S702).

When detecting, after the correction of the characters on the editing screen 90b (Step S703), an operation performed on the Save button through the touch screen 21 (Step S704), the smartphone 1 displays the notification screen 80, to which a tag 80e whose content is updated and the tag 80c are attached, on the display 2 (Step S705).

Examples of a processing procedure performed by the smartphone 1 according to Embodiment 2 will be explained with reference to FIG. 27 and FIG. 28. The processing procedures illustrated in FIG. 27 and FIG. 28 are implemented by the controller 10 executing the control program 9A and the like stored in the storage 9.

Figure 27:
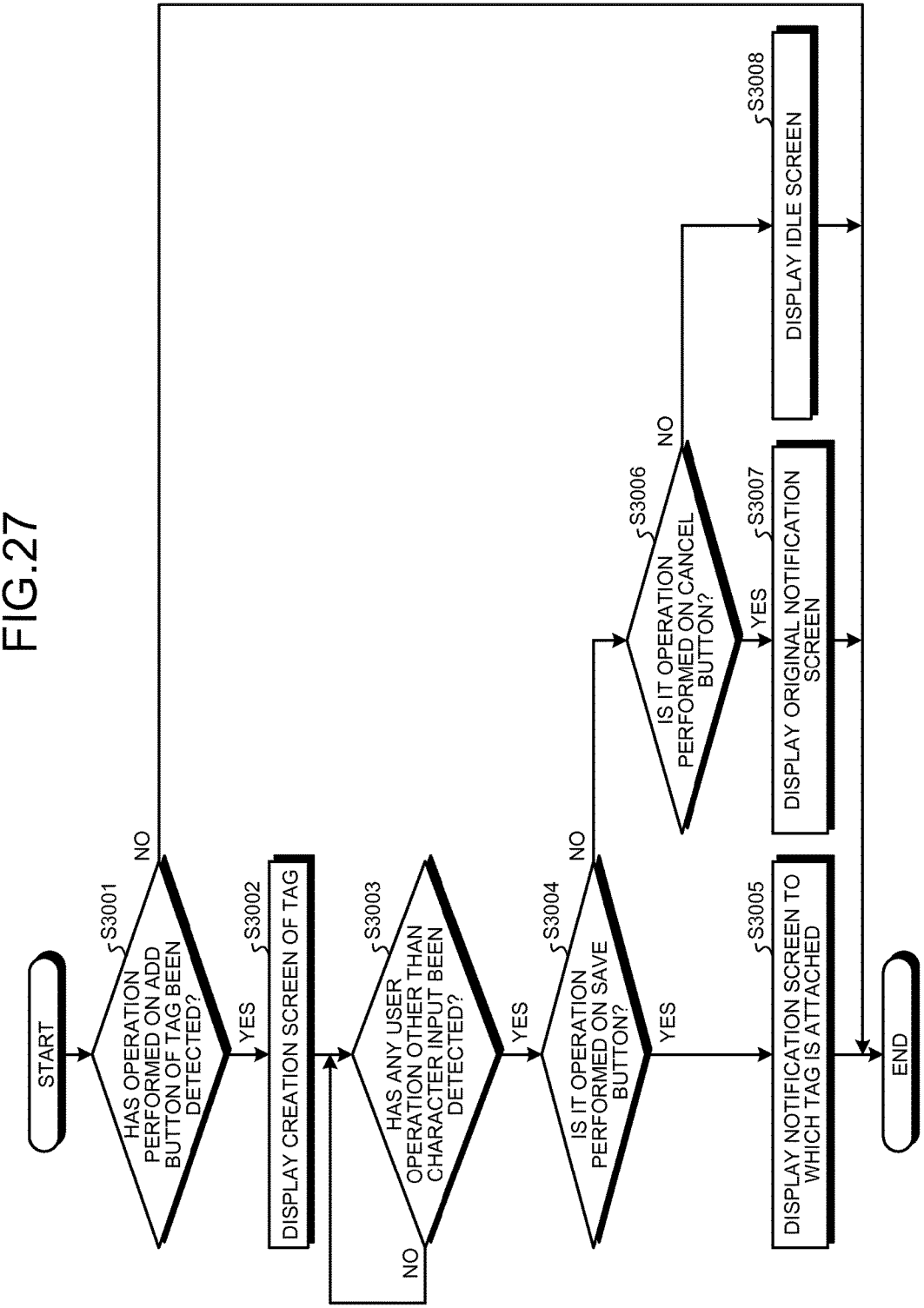
FIG. 27 is a flowchart of a processing procedure of when a text is created in the notification screen displayed on the display.
Figure 28:
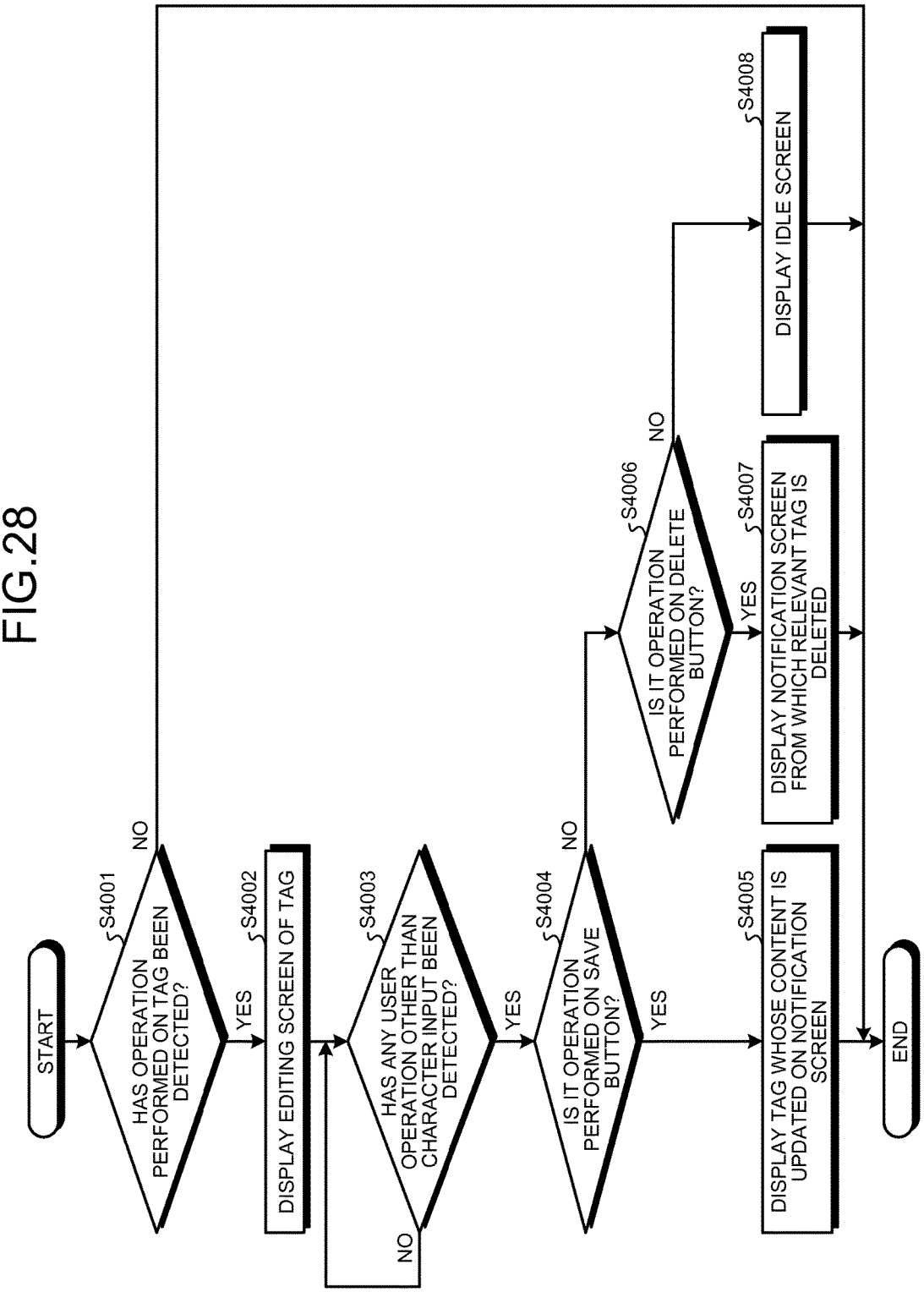
FIG. 28 is a flowchart of a processing procedure of when the text displayed in the notification screen is edited.

FIG. 27 is a flowchart of a processing procedure of when a text is created in the notification screen displayed on the display 2.

As illustrated in FIG. 27, the controller 10 determines whether an operation performed on the Add button (+Add) of a tag in the operation bar 80*b* displayed on the notification screen 80 has been detected through the touch screen 21 (Step S3001). The operation performed on the Add button (+Add) of the tag may be any operation such as touch, tap, or swipe.

When it is determined that an operation performed on the Add button (+Add) of the tag has not been detected (No at Step S3001), the controller 10 ends the processing without further performing the processing procedure illustrated in FIG. 27.

Meanwhile, when it is determined that an operation performed on the Add button (+Add) of the tag has been detected (Yes at Step S3001), the controller 10 displays the creation screen 90*a* of the tag (see FIG. 23 or FIG. 24) on the display 2 (Step S3002).

Subsequently, the controller 10 determines whether any user operation other than the character input has been detected (Step S3003).

When it is determined that any user operation other than the character input has not been detected (No at Step S3003), the controller 10 re-executes the determination at Step S3003 in response to reaching a next determination timing due to a predetermined polling period.

Meanwhile, when it is determined that any user operation other than the character input has been detected (Yes at Step S3003), the controller 10 determines whether the user operation is an operation performed on the Save button provided in the creation screen 90*a* of the tag (Step S3004). The operation performed on the Save button may be any operation such as touch, tap, or swipe similar to the operation performed on the Add button (+Add) of the tag.

When it is determined that it is the operation performed on the Save button (Yes at Step S3004), the controller 10 displays the notification screen 80 to which the tag is attached on the display 2 (Step S3005), and ends the processing procedure illustrated in FIG. 27.

Meanwhile, when it is determined that it is not the operation performed on the Save button (No at Step S3004), the controller 10 determines whether it is an operation performed on the Cancel button (Step S3006).

When it is determined that it is the operation performed on the Cancel button (Yes at Step S3006), the controller 10 displays the original notification screen 80 without the tag on the display 2 (Step S3007), and ends the processing procedure illustrated in FIG. 27.

Meanwhile, when it is determined that it is not the operation performed on the Cancel button (No at Step S3006), the controller 10 displays the idle screen (lock screen 40) on the display 2 (Step S3008), and ends the processing procedure illustrated in FIG. 27. This means that the controller 10 determines the case, in which the user operation is not the operation performed on the Save button and the Cancel button, as an operation not related to, for example, the creation of the tag and temporarily returns to the idle state (lock screen 40).

FIG. 28 is a flowchart of a processing procedure of when the text displayed in the notification screen is edited.

As illustrated in FIG. 28, the controller 10 determines whether an operation performed on the tag displayed in the notification screen 80 has bee detected through the touch screen 21 (Step S4001). The operation performed on the tag may be any operation such as touch, tap, or swipe.

When it is determined that an operation performed on the tag has not been detected (No at Step S4001), the controller 10 ends the processing without further performing the processing procedure illustrated in FIG. 28.

Meanwhile, when it is determined that an operation performed on the tag has been detected (Yes at Step S4001), the controller 10 displays the editing screen 90*b* of the tag (see FIG. 25 or FIG. 26) on the display 2 (Step S4002).

Subsequently, the controller 10 determines whether any user operation other than the character input has been detected (Step S4003).

When it is determined that any user operation other than the character input has not been detected (No at Step S4003), the controller 10 re-executes the determination at Step S4003 in response to reaching a next timing due to a predetermined polling period.

Meanwhile, when it is determined that any user operation other than the character input has been detected (Yes at Step S4003), the controller 10 determines whether the user operation is an operation performed on the Save button provided in the editing screen 90*b* of the tag (Step S4004). The operation performed on the Save button may be any operation such as touch, tap, or swipe.

When it is determined that it is the operation performed on the Save button (Yes at Step S4004), the controller 10 displays the tag whose content is updated in the notification screen 80 (Step S4005), and ends the processing procedure illustrated in FIG. 28.

Meanwhile, when it is determined that it is not the operation performed on the Save button (No at Step S4004), the controller 10 determines whether it is an operation performed on the Delete button (Step S4006).

When it is determined that it is the operation performed on the Delete button (Yes at Step S4006), the controller 10 displays the notification screen 80 from which the relevant tag is deleted on the display 2 (Step S4007), and ends the processing procedure illustrated in FIG. 28.

Meanwhile, when it is determined that it is not the operation performed on the Delete button (No at Step S4006), the controller 10 displays the idle screen (lock screen 40) on the display 2 (Step S4008), and ends the processing procedure illustrated in FIG. 28. This means that the controller 10 determines the case, in which the user operation is not the operation performed on the Save button and the Delete button, as an operation not related to, for example, the editing of the tag and temporarily returns to the idle state (lock screen 40).

As explained above, in Embodiment 2, the smartphone 1 displays the notification screen 80 to which the tag being the text data is attached on the display 2. Therefore, according to Embodiment 2, the notification screen 80 can be effectively used as a user-specific utility tool.

In Embodiment 2, the smartphone 1 displays the creation screen of the tag on the display 2. Therefore, according to Embodiment 2, the user can create a text to be displayed on the display 2 with a simple operation through the touch screen 21.

In Embodiment 2, the smartphone 1 displays the editing screen of the tag on the display 2. Therefore, according to Embodiment 2, the user can edit the text displayed on the display 2 with a simple operation through the touch screen 21.

In Embodiment 2, the smartphone 1 can display the creation screen or the editing screen on the display 2 from the locked state. Therefore, according to Embodiment 2, the user can quickly create or edit a text.

Embodiment 3

In Embodiment 2, control may be performed such that a creation screen of a tag may is displayed in response to an operation accepted on an application execution screen.

The control program 9A provides a function for displaying the creation screen of a tag in response to an operation accepted on the application execution screen. For example, the control program 9A may provide a function for displaying the creation screen of the tag, on the display 2, which takes over the characters input by the character input application 9G, in response to an operation accepted on the execution screen of the character input application 9G.

The controller 10 executes the control program 9A to thereby implement the processing for displaying the creation screen of the tag in response to an operation accepted on the application execution screen. For example, the controller 10 implements the processing for displaying the creation screen of the tag, on the display 2, which takes over the characters input by the character input application 9G, in response to an operation accepted on the execution screen of the character input application 9G.

Figure 29:
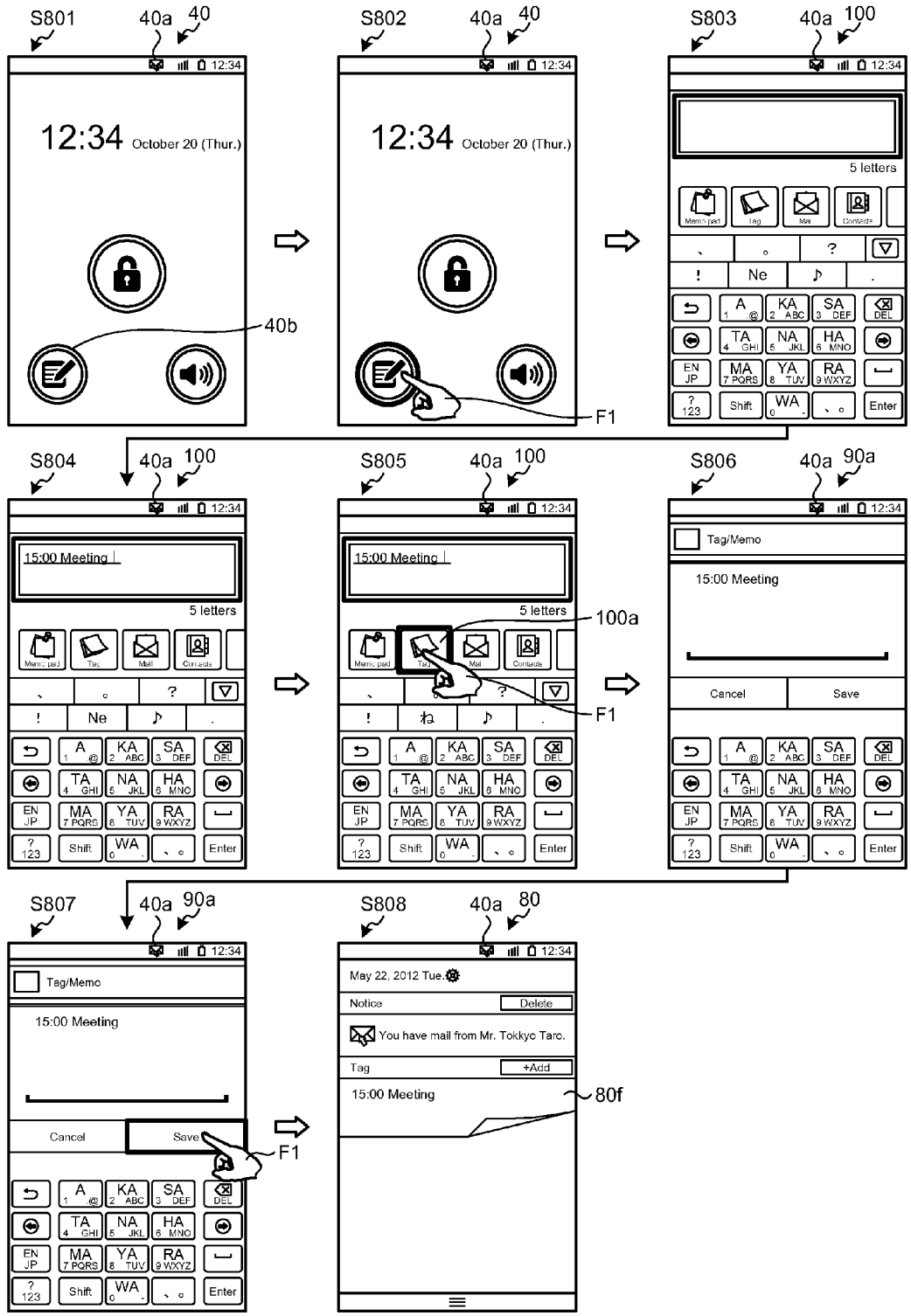
FIG. 29 is a diagram of one of examples of control performed by a smartphone 1 when a creation screen of a tag is displayed from a character input application being executed.

FIG. 29 is a diagram of one of examples of control performed by the smartphone 1 when the creation screen of the tag is displayed from the character input application 9G being executed. Sign F1 appearing in FIG. 29 indicates the user's finger.

As illustrated in FIG. 29, the smartphone 1 displays the lock screen 40 on the display 2 (Step S801). Displayed on the lock screen 40 is an icon 40b for activating the character input application 9G using its shortcut.

Subsequently, when detecting an operation performed on the icon 40b displayed on the lock screen 40 through the touch screen 21 (Step S802), the smartphone 1 displays an execution screen 100 of the character input application 9G on the display 2 (Step S803). The operation performed on the icon 40b may be any operation such as tap, double tap, or long touch. Displayed on the execution screen 100 are a window for displaying input characters, a software keyboard for character input, and icons of applications capable of direct activation from the character input application 9G, etc.

Then when detecting, after the input of the characters on the execution screen 100 (Step S804), an operation performed on an icon 100a corresponding to the tag application 9H displayed on the execution screen 100 through the touch screen 21 (Step S805), the smartphone 1 displays the creation screen 90a of the tag, on the display 2, which takes over the characters input by the character input application 9G (Step S806). The operation performed on the icon 100a may be any operation such as tap, double tap, or long touch.

Subsequently, when detecting an operation performed on the Save button through the touch screen 21 (Step S807), the smartphone 1 displays the notification screen 80, to which a tag 80f including the characters input on the creation screen 90a is attached, on the display 2 (Step S808).

One of examples of a processing procedure performed by the smartphone 1 according to Embodiment 3 will be explained with reference to FIG. 30. The processing procedure illustrated in FIG. 30 is implemented by the controller 10 executing the control program 9A and the like stored in the storage 9.

Figure 30:
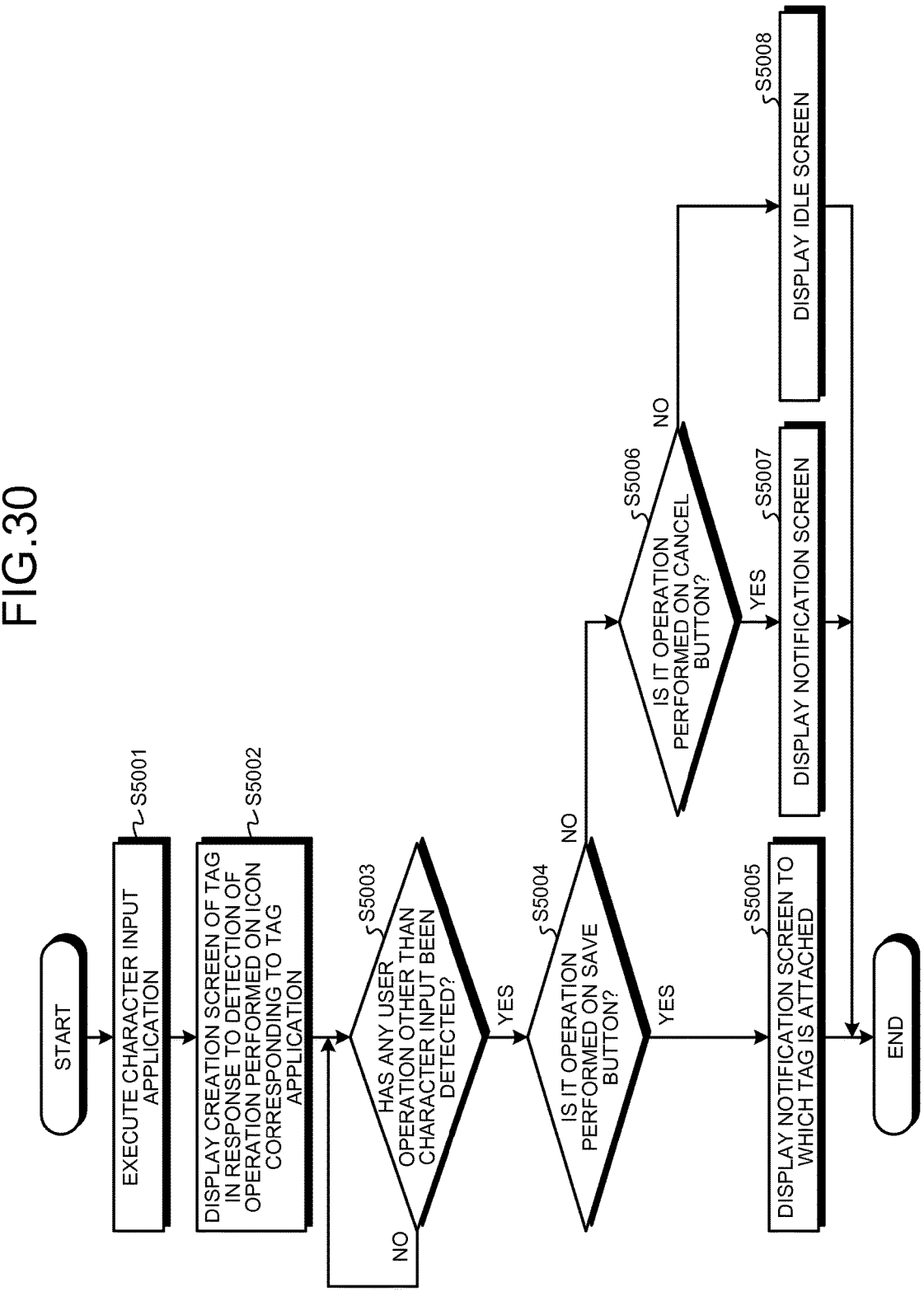
FIG. 30 is a flowchart of a processing procedure of when the creation screen of the tag is displayed from the character input application being executed.

FIG. 30 is a flowchart of a processing procedure of when the creation screen of the tag is displayed from the character input application 9G being executed.

As illustrated in FIG. 30, when detecting an operation performed on the icon 40b displayed on the lock screen 40 through the touch screen 21, the controller 10 executes the character input application 9G (Step S5001).

Subsequently, the controller 10 displays the creation screen 90a of the tag on the display 2 in response to detection of the operation performed on the icon 100a corresponding to the tag application 9H displayed on the execution screen 100 of the character input application 9G (Step S5002). For example, the characters input by the character input application 9G are taken over in the creation screen 90a of the tag displayed on the display 2 at Step S5002 (see FIG. 29, etc).

Subsequently, the controller 10 determines whether any user operation other than the character input has been detected (Step S5003).

When it is determined that any user operation other than the character input has not been detected (No at Step S5003), the controller 10 re-executes the determination at Step S5003 in response to reaching a next determination timing due to the predetermined polling period.

Meanwhile, when it is determined that any user operation other than the character input has been detected (Yes at Step S5003), the controller 10 determines whether the user operation is an operation performed on the Save button provided in the creation screen 90a of the tag (Step S5004). The operation performed on the Save button may be any operation such as touch, tap, or swipe similar to the operation performed on the Add button (+Add) of the tag.

When it is determined that it is the operation performed on the Save button (Yes at Step S5004), the controller 10 displays the notification screen 80 to which the tag is attached on the display 2 (Step S5005), and ends the processing procedure illustrated in FIG. 30.

Meanwhile, when it is determined that it is not the operation performed on the Save button (No at Step S5004), the controller 10 determines whether it is an operation performed on the Cancel button (Step S5006).

When it is determined that it is the operation performed on the Cancel button (Yes at Step S5006), the controller 10 displays the notification screen 80 without the tag on the display 2 (Step S5007), and ends the processing procedure illustrated in FIG. 30.

Meanwhile, when it is determined that it is not the operation performed on the Cancel button (No at Step S5006), the controller 10 displays the idle screen (lock screen 40) on the display 2 (Step S5008), and ends the processing procedure illustrated in FIG. 30. This means that the controller 10 determines the case, in which the user operation is not the operation performed on the Save button and the Cancel button, as an operation not related to, for example, the creation of the tag and temporarily returns to the idle state (lock screen 40).

As explained above, in Embodiment 3, the smartphone 1 displays the creation screen of the tag, on the display 2, which takes over the characters input by the character input application 9G, in response to an operation accepted on the application execution screen 100 of the character input application 9G. Therefore, according to Embodiment 3, the text including characters to be input using the character input application 9G can be displayed on the display 2 directly from the character input application 9G.

The embodiment is not limited to the example of displaying the creation screen of the tag from the character input application 9G being executed as is Embodiment 3. For example, it may be configured to previously provide a shortcut key or an icon of the tag application 9H on the lock screen 40 and display the creation screen of the tag on the display 2 when the shortcut key or the like of the tag application 9H is operated on the lock screen 40.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

For example, each of the programs illustrated in FIG. 22 may be divided into a plurality of modules. Alternatively, each of the programs illustrated in FIG. 22 may be integrated with other program.

In the embodiment, the smartphone has been explained as one of examples of the electronic device; however, the device according to the appended claims is not limited to the smartphone. The device according to the appended claims may be any mobile electronic device other than the smartphone. The mobile electronic device is, for example, a mobile phone, a tablet, a mobile personal computer, a digital camera, a media player, an electronic book reader, a navigator, and a gaming device. The device according to the appended claims may be a stationary-type electronic device. The stationary-type electronic device is, for example, a desktop personal computer and a television receiver.

The invention claimed is:

1. An electronic device, comprising:
a display configured to display a notification screen that includes a notification area for notifying information; and
a controller configured to shift, in response to detecting an operation, the notification screen displayed on the display to an editing screen for editing the notification screen,
wherein, while an editable notification is being edited on the editing screen, other editable notifications remain displayed on the editing screen,
wherein the notification screen includes an edit button, and other areas different from the notification area, and
wherein, in response to a gesture on the edit button, the controller is configured to shift the notification screen displayed on the display to the editing screen,
arrange, in the editing screen, individual editing buttons in the other areas, wherein the individual editing buttons are for starting editing the other areas corresponding to said individual editing buttons, and
not arrange any of the individual editing buttons in the notification area.

2. The electronic device according to claim 1, wherein, in response to detecting an operation of adding at least one other area different from the notification area in the editing screen,
the controller is configured to reflect the addition of the at least one other area in the notification screen.

3. The electronic device according to claim 2, wherein, in response to detecting an operation of deleting the at least one other area in the editing screen,
the controller is configured to reflect the deletion of the at least one other area in the notification screen.

4. The electronic device according to claim 2, wherein, in response to detecting an operation of mutually changing a display position of the notification area and a display position of the at least one other area in the editing screen,
the controller is configured to reflect the change of the display positions of the notification area and the at least one other area in the notification screen.

5. The electronic device according to claim 2, wherein, in response to detecting an operation of changing a component included in the at least one other area in the editing screen,
the controller is configured to reflect the change of the component in the notification screen.

6. The electronic device according to claim 1, wherein, in response to detecting an operation of deleting the notification area in the editing screen,
the controller is configured to not reflect the deletion of the notification area in the notification screen.

7. The electronic device according to claim 1, further comprising an operating unit, wherein
the controller is configured to display a text created through the operating unit on the notification screen.

8. The electronic device according to claim 7, wherein the controller is configured to display a creation screen for accepting a creation operation of the text on the display.

9. The electronic device according to claim 1, wherein the controller is configured to display the edited notification screen upon completion of the editing of the notification screen.

10. The electronic device according to claim 1, wherein the notification screen displays a plurality of editable notifications, and the editing screen displays more than one editable notifications among the plurality of editable notifications.

11. The electronic device according to claim 1, wherein the display is configured to further display, simultaneously with and outside the notification screen, a status bar.

12. The electronic device according to claim 11, wherein the status bar includes an icon,
the notification area includes notifying information associated with the icon, and
while the editing screen is being displayed, the controller is configured to cause the display to maintain displaying the icon on the status bar.

13. The electronic device according to claim 12, wherein the notification screen further includes a notification deleting button arranged in the notification area,
while the notification screen is being displayed and in response to detecting a gesture on the notification deleting button, the controller is configured to delete the icon from the status bar.

14. The electronic device according to claim 13, wherein the controller is configured to
not display the notification deleting button, in response to the notification screen being shifted to the editing screen, and
display the notification deleting button, in response to the editing screen being shifted to the notification screen.

15. A control method for controlling an electronic device that includes a display, the control method comprising:
displaying, on the display, a notification screen that includes a notification area for notifying information; and
shifting, in response to detecting an operation, the notification screen displayed on the display to an editing screen for editing the notification screen,
wherein, while an editable notification is being edited on the editing screen, other editable notifications remain displayed on the editing screen,
wherein the notification screen includes an edit button, and other areas different from the notification area, and wherein, in response to a gesture on the edit button, the control method comprises shifting the notification screen displayed on the display to the editing screen, arranging, in the editing screen, individual editing buttons in the other areas, wherein the individual editing buttons are for starting editing the other areas corresponding to said individual editing buttons, and not arranging any of the individual editing buttons in the notification area.

16. The control method according to claim 15, further comprising:

accepting creation of a text through an operating unit of the electronic device; and displaying the created text on the notification screen.

17. A non-transitory storage medium that stores a control program that causes, when executed by an electronic device that includes a display, the electronic device to execute a control method comprising:

displaying, on the display, a notification screen that includes a notification area for notifying information ; and shifting, in response to detecting an operation, the notification screen displayed on the display to an editing screen for editing the notification screen, wherein, while an editable notification is being edited on the editing screen, other editable notifications remain displayed on the editing screen, wherein the notification screen includes an edit button, and other areas different from the notification area, and wherein, in response to a gesture on the edit button, the control method comprises shifting the notification screen displayed on the display to the editing screen, arranging, in the editing screen, individual editing buttons in the other areas, wherein the individual editing buttons are for starting editing the other areas corresponding to said individual editing buttons, and not arranging any of the individual editing buttons in the notification area.

18. The non-transitory storage medium according to claim 17, wherein the control program further causes, when executed by the electronic device, the electronic device to execute:

accepting creation of a text through an operating unit of the electronic device; and displaying the created text on the notification screen.

* * * * *